United States Patent
Jamwal et al.

(10) Patent No.: US 12,191,964 B2
(45) Date of Patent: Jan. 7, 2025

(54) USER RECEIVE BEAM MEASUREMENT PRIORITIZATION

(71) Applicant: QUALCOMM Incorporated, San Diego, CA (US)

(72) Inventors: Upamanyu Jamwal, Mandi (IN); Jun Zhu, San Diego, CA (US); Kang Gao, San Diego, CA (US); Arnab Pal, Hyderabad (IN); Nagaraju Gajula, San Diego, CA (US); Sumanth Kumar Kota, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 407 days.

(21) Appl. No.: 17/744,541

(22) Filed: May 13, 2022

(65) Prior Publication Data

US 2023/0370143 A1   Nov. 16, 2023

(51) Int. Cl.
*H04B 7/08*   (2006.01)
*H04B 7/06*   (2006.01)
*H04W 24/08*   (2009.01)
*H04W 24/10*   (2009.01)

(52) U.S. Cl.
CPC .......... *H04B 7/0695* (2013.01); *H04W 24/08* (2013.01); *H04W 24/10* (2013.01)

(58) Field of Classification Search
None
See application file for complete search history.

(56) References Cited

U.S. PATENT DOCUMENTS

| | | | |
|---|---|---|---|
| 2018/0176710 A1* | 6/2018 | Jang | H04W 24/10 |
| 2019/0182805 A1* | 6/2019 | Zhu | H04W 72/56 |
| 2020/0137657 A1* | 4/2020 | Chavva | H04W 36/0058 |
| 2021/0409095 A1* | 12/2021 | Zhang | H04L 5/0053 |
| 2023/0224015 A1* | 7/2023 | Baig | H04B 7/0695 375/262 |
| 2023/0232273 A1* | 7/2023 | Mandelli | H04W 28/0268 370/329 |

* cited by examiner

*Primary Examiner* — Scott M Sciacca
(74) *Attorney, Agent, or Firm* — Holland & Hart LLP

(57) ABSTRACT

Methods, systems, and devices for wireless communication are described. A user equipment (UE) may measure a reference signal over a first subset of a set of measurement occasions using a serving UE receive beam according to a serving beam measurement periodicity. The UE may measure the reference signal over a second subset of the set of measurement occasions using a first subset of candidate UE receive beams of a set of candidate UE receive beams. The UE may measure the reference signal over a third subset of the set of measurement occasions using a second subset of candidate UE receive beams of the set of candidate UE receive beams. The UE may perform beam switching to a candidate UE receive beam of the set of candidate UE receive beams based at least in part on a result of measuring the reference signal.

30 Claims, 11 Drawing Sheets

USER RECEIVE BEAM MEASUREMENT PRIORITIZATION

FIELD OF TECHNOLOGY

The following relates to wireless communication, including user receive beam measurement prioritization.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support user receive beam measurement prioritization. For example, the described techniques provide for a user equipment (UE) to prioritize candidate UE receive (Rx) beams to improve beam switching. For example, a UE may maintain a first subset of candidate UE Rx beams (e.g., a Class 3 beam set) that are measured more frequently within the available measurement occasions than a second subset of candidate UE Rx beams in the set of candidate UE Rx beams (e.g., the remaining candidate UE Rx beams in the candidate set). The candidate UE Rx beams in the first subset (e.g., the Class 3 beams) may be associated with a performance metric (e.g., reference signal receive power (RSRP)) level (alone or with other performance metric(s)) within a threshold range of the serving UE Rx beam. The performance metric level for the first subset may be between the candidate threshold range (e.g., to be included in the candidate set) and the serving threshold range (e.g., the best UE Rx beam). Accordingly, the UE may measure the reference signal (e.g., synchronization signal block (SSB) reference signals) using the serving UE Rx beam during a first subset of a set of measurement occasions. The UE may then measure the reference signal using the first subset of candidate UE Rx beams (e.g., the Class 3 beams) during a second subset of the set of measurement occasions. The UE may then measure the reference signal using the second subset of candidate UE Rx beams (e.g., the remaining beams in the candidate set) during a third subset of the set of measurement occasions. The UE may perform beam switching to a candidate beam based on the results of the measurements.

A method for wireless communication at a UE is described. The method may include measuring a reference signal over a first subset of a set of measurement occasions using a serving UE receive beam according to a serving beam measurement periodicity, measuring the reference signal over a second subset of the set of measurement occasions using a first subset of candidate UE receive beams of a set of candidate UE receive beams, each candidate UE receive beam in the first subset of candidate UE receive beams satisfying a performance threshold relative to the serving UE receive beam, measuring the reference signal over a third subset of the set of measurement occasions using a second subset of candidate UE receive beams of the set of candidate UE receive beams, each candidate UE receive beam in the second subset of candidate UE receive beams failing to satisfy the performance threshold relative to the serving UE receive beam, and performing beam switching to a candidate UE receive beam of the set of candidate UE receive beams based on a result of measuring the reference signal.

An apparatus for wireless communication at a UE is described. The apparatus may include a processor, memory coupled with the processor, and instructions stored in the memory. The instructions may be executable by the processor to cause the apparatus to measure a reference signal over a first subset of a set of measurement occasions using a serving UE receive beam according to a serving beam measurement periodicity, measure the reference signal over a second subset of the set of measurement occasions using a first subset of candidate UE receive beams of a set of candidate UE receive beams, each candidate UE receive beam in the first subset of candidate UE receive beams satisfying a performance threshold relative to the serving UE receive beam, measure the reference signal over a third subset of the set of measurement occasions using a second subset of candidate UE receive beams of the set of candidate UE receive beams, each candidate UE receive beam in the second subset of candidate UE receive beams failing to satisfy the performance threshold relative to the serving UE receive beam, and perform beam switching to a candidate UE receive beam of the set of candidate UE receive beams based on a result of measuring the reference signal.

Another apparatus for wireless communication at a UE is described. The apparatus may include means for measuring a reference signal over a first subset of a set of measurement occasions using a serving UE receive beam according to a serving beam measurement periodicity, means for measuring the reference signal over a second subset of the set of measurement occasions using a first subset of candidate UE receive beams of a set of candidate UE receive beams, each candidate UE receive beam in the first subset of candidate UE receive beams satisfying a performance threshold relative to the serving UE receive beam, means for measuring the reference signal over a third subset of the set of measurement occasions using a second subset of candidate UE receive beams of the set of candidate UE receive beams, each candidate UE receive beam in the second subset of candidate UE receive beams failing to satisfy the performance threshold relative to the serving UE receive beam, and means for performing beam switching to a candidate UE receive beam of the set of candidate UE receive beams based on a result of measuring the reference signal.

A non-transitory computer-readable medium storing code for wireless communication at a UE is described. The code may include instructions executable by a processor to measure a reference signal over a first subset of a set of measurement occasions using a serving UE receive beam according to a serving beam measurement periodicity, measure the reference signal over a second subset of the set of measurement occasions using a first subset of candidate UE receive beams of a set of candidate UE receive beams, each candidate UE receive beam in the first subset of candidate UE receive beams satisfying a performance threshold relative to the serving UE receive beam, measure the reference signal over a third subset of the set of measurement occasions using a second subset of candidate UE receive beams of the set of candidate UE receive beams, each candidate UE receive beam in the second subset of candidate UE receive beams failing to satisfy the performance threshold relative to the serving UE receive beam, and perform beam switching to a candidate UE receive beam of the set of candidate UE receive beams based on a result of measuring the reference signal.

In some examples of the method, apparatuses, and non-transitory computer-readable medium described herein, the second subset of the set of measurement occasions includes at least one measurement occasion within each time period of the serving beam measurement periodicity.

Some examples of the method, apparatuses, and non-transitory computer-readable medium described herein may further include operations, features, means, or instructions for determining that a first candidate UE receive beam of the second subset of candidate UE receive beams satisfies the performance threshold relative to the serving UE receive beam and adding the first candidate UE receive beam to the first subset of candidate UE receive beams based on the determining.

Some examples of the method, apparatuses, and non-transitory computer-readable medium described herein may further include operations, features, means, or instructions for determining, based on the adding, that a numerical quantity of candidate UE receive beams in the first subset of candidate UE receive beams exceeds a threshold quantity and demoting a second candidate UE receive beam associated with a second performance threshold to the second subset of candidate UE receive beams to the second subset of candidate UE receive beams.

In some examples of the method, apparatuses, and non-transitory computer-readable medium described herein, scheduling measurements during the second subset of the set of measurement occasions where each candidate UE receive beam in the first subset of candidate UE receive beams may be measured a first measurement threshold number of times during the set of measurement occasions.

In some examples of the method, apparatuses, and non-transitory computer-readable medium described herein, scheduling measurements during the third subset of the set of measurement occasions where each candidate UE receive beam in the second subset of candidate UE receive beams may be measured a second measurement threshold number of times during the set of measurement occasions.

In some examples of the method, apparatuses, and non-transitory computer-readable medium described herein, each candidate UE receive beam in the second subset of candidate UE receive beams satisfy a second threshold that may be different from the performance threshold.

In some examples of the method, apparatuses, and non-transitory computer-readable medium described herein, the reference signal includes a SSB signal.

In some examples of the method, apparatuses, and non-transitory computer-readable medium described herein, a numerical quantity of candidate UE receive beams in the first subset of candidate UE receive beans may be based on a number of measurement occasions in the set of measurement occasions.

DETAILED DESCRIPTION

Figure 1:
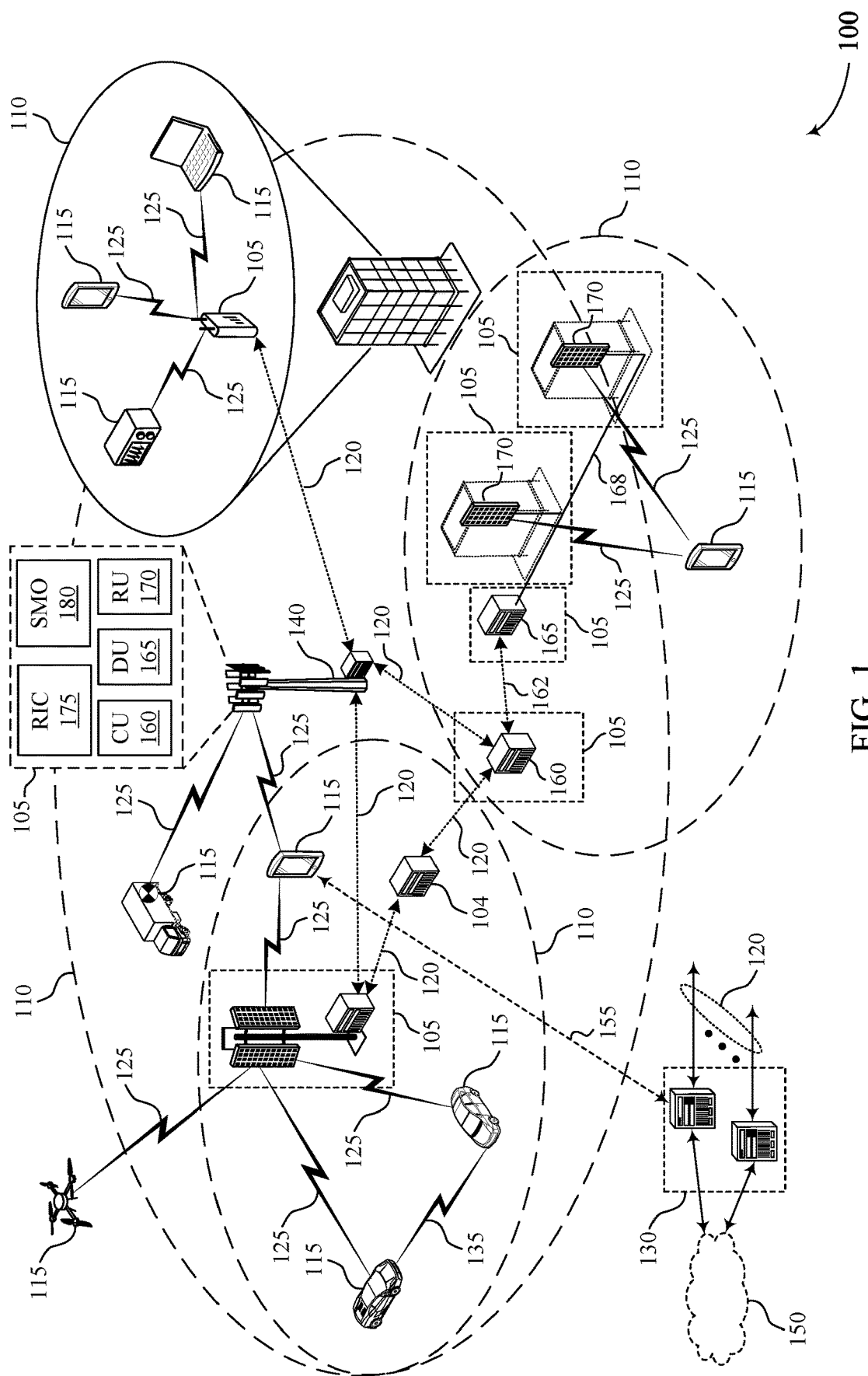
FIG. 1 illustrates an example of a wireless communications system that supports user receive beam measurement prioritization in accordance with one or more aspects of the present disclosure.

Wireless communications may employ directional communications using transmit and/or receive beams. For example, a network entity may transmit a wireless signal to a user equipment (UE) using beamforming techniques and over a transmit beam of the network entity. The UE may use a UE receive (Rx) beam to receive the wireless signal, where the UE Rx beam provides directional receive gains improving reception. The UE Rx beam may be considered a serving UE Rx beam, with the UE also maintaining a candidate UE Rx beam set. The UE Rx beams in the candidate UE Rx beam set generally include UE Rx beams associated with a reference signal received power (RSRP), or some other performance metric, satisfying a candidate threshold, and may be the prime candidates the UE selects from when the current serving UE Rx beam drops below a serving beam threshold. The UE may measure reference signals (e.g., a synchronization signal block (SSB)) during measurement occasions to ensure the serving UE Rx beam performance as well as update the set of candidate UE Rx beams. However, the measurement occasions are generally limited in the time domain and conventional techniques do not provide a mechanism for the UE to prioritize candidate UE Rx beams in the set.

Accordingly, the described techniques provide various mechanisms for a UE to prioritize candidate UE Rx beams to improve beam switching. For example, a UE may maintain a first subset of candidate UE Rx beams (e.g., a Class 3 beam set) that are measured more frequently within the available measurement occasions than a second subset of candidate UE Rx beams in the set of candidate UE Rx beams (e.g., the remaining candidate UE Rx beams in the candidate set). The candidate UE Rx beams in the first subset (e.g., the Class 3 beams) may be associated with a performance metric (e.g., RSRP) level (alone or with other performance metric(s)) within a threshold range of the serving UE Rx beam that is between the candidate threshold range (e.g., to be included in the candidate set) and the serving beam performance metric (e.g., the best UE Rx beam). Accordingly, the UE may measure the reference signal (e.g., SSB reference signals) using the serving UE Rx beam during a first subset of a set of measurement occasions. The UE may then measure the reference signal using the first subset of candidate UE Rx beams (e.g., the Class 3 beams) during a second subset of the set of measurement occasions. The UE may then measure the reference signal using the second subset of candidate UE Rx beams (e.g., the remaining beams in the candidate set) during a third subset of the set of measurement occasions. The UE may perform beam switching to a candidate beam based on the results of the measurements.

Aspects of the disclosure are initially described in the context of wireless communications systems. Aspects of the disclosure are further illustrated by and described with reference to apparatus diagrams, system diagrams, and flowcharts that relate to user receive beam measurement prioritization.

FIG. 1 illustrates an example of a wireless communications system 100 that supports user receive beam measurement prioritization in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support user receive beam measurement prioritization as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrow band IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time.

For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrow band communications), or a combination of these techniques. For example, some UEs 115 may be configured for operation using a narrow band protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHZ.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

A UE 115 may measure a reference signal over a first subset of a set of measurement occasions using a serving UE Rx beam according to a serving beam measurement periodicity. The UE 115 may measure the reference signal over a second subset of the set of measurement occasions using a first subset of candidate UE Rx beams of a set of candidate UE Rx beams, each candidate UE Rx beam in the first subset of candidate UE Rx beams satisfying a performance threshold relative to the serving UE Rx beam. The UE 115 may measure the reference signal over a third subset of the set of measurement occasions using a second subset of candidate UE Rx beams of the set of candidate UE Rx beams, each candidate UE Rx beam in the second subset of candidate UE Rx beams failing to satisfy the performance threshold relative to the serving UE Rx beam. The UE 115 may perform beam switching to a candidate UE Rx beam of the set of candidate UE receive beams based at least in part on a result of measuring the reference signal.

Figure 2:
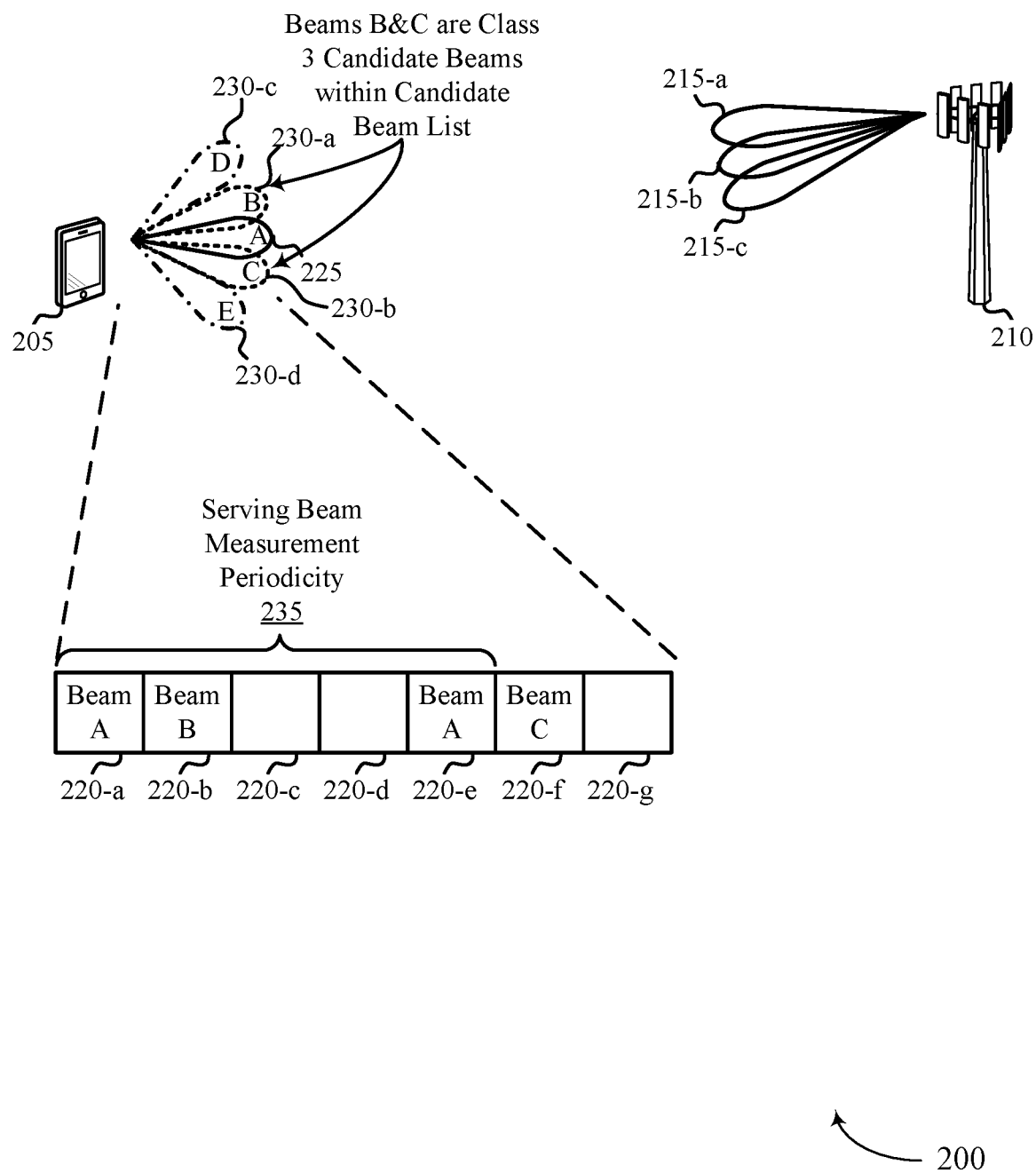
FIG. 2 illustrates an example of a wireless communication system that supports user receive beam measurement prioritization in accordance with one or more aspects of the present disclosure.

FIG. 2 illustrates an example of a wireless communication system 200 that supports user receive beam measurement prioritization in accordance with one or more aspects of the present disclosure. Wireless communication system 200 may implement aspects of wireless communication system 100. Wireless communication system 200 may include UE 205 and network entity 210, which may be examples of the corresponding devices described herein. In some aspects, network entity 210 may be a serving network entity for UE 205, such as a serving base station, cell, TRP, etc.

Wireless communication system 200 may employ directional communications using transmit and/or receive beams. For example, network entity 210 may transmit a wireless signal to UE 205 using a transmit beam 215 of network entity 210. For example, network entity 210 may use transmit beam 215 to perform downlink transmissions, SSB transmissions, CSI-RS transmissions, and the like, to UE 205. In some examples, network entity 210 may use different transmit beams 215 when performing beamformed/directional transmissions. As one non-limiting example, this may include network entity 210 performing reference signal transmissions (e.g., SSB reference signal transmissions, or other transmissions) in a beam-sweeping manner to ensure coverage within its coverage area. In this reference signal example, this may include network entity 210 performing reference signal transmissions using transmit beam 215-a during a first set of occasions, using transmit beam 215-b during a second set of occasions, using transmit beam 215-c during a third set of occasions, and so on. Performing such reference signal transmissions in a beam-sweeping manner may enable UE (such as UE 205) to perform various beam detection and management functions.

Similarly, UE 205 may use a UE Rx beam to receive the wireless signal, where the UE Rx beam provides directional receive gains improving reception of the transmissions from network entity 210. UE 205 may have a serving UE Rx beam (e.g., beam A, such as Rx beam 225, in this example) that has been determined to be the best UE Rx beam to use for communications with network entity 210. For example, UE 205 may be operating in a RRC connected or inactive mode/state with network entity 210. UE 205 may have previously performed beam detection and management procedures where UE 205 cycles through its available UE Rx beams to determine which beam satisfies a serving beam performance threshold (e.g., Rx beam 225, or beam A, in this example). The serving Rx beam of UE 205 may generally be considered the beam having or otherwise associated with the best performance metrics among the available Rx beams of UE 205 (e.g., having the best performance metrics, such as the highest RSRP, the highest throughput, the lowest interference, the lowest latency, etc.). Accordingly, UE 205 may generally use its serving UE Rx beam (Rx beam 225 in this example) to optimally receive beamformed transmissions from network entity 210.

UE 205 may also maintain a candidate UE Rx beam set. The UE Rx beams in the candidate UE Rx beam set generally include UE Rx beam(s) having or otherwise associated with a RSRP, or some other performance metric, satisfying a candidate UE Rx beam performance threshold. For example, UE 205 may determine (e.g., identify, select, be (pre) configured with) its serving UE Rx beam as the UE Rx beam having the best performance metric, which may satisfy the serving beam performance threshold in some examples. However, UE 205 may be configured with or otherwise support a set of UE Rx beams, such as four, eight, twelve, or some other number of UE Rx beams. Of course some of the UE Rx beams may be unusable for communications at a given time (e.g., due to blockage, the orientation of UE 205 relative to network entity 210, prioritized for other use, etc.). However and in addition to the serving beam (e.g., Rx beam 225, which corresponds to beam A of UE 205), UE 205 may also identify a set of candidate UE Rx beams using beam detection and management techniques.

For example, UE 205 may periodically use a UE Rx beam to attempt to detect a reference signal during a measurement occasion 220. In some examples, the measurement occasion 220 may generally correspond to one or more symbols, mini-slots, slots, sub-frames, frames, etc., in the time domain. In some examples, the measurement occasion 220 may generally correspond to one or more symbols within a (mini-) slot, (mini-) slot(s) within a sub-frame, sub-frame(s) within a frame, etc., in the time domain. Generally, network entity 210 may be scheduled to transmit reference signals (e.g., SSB reference signals) using a transmit beam 215 during each measurement occasion 220, which UE 205 may then attempt to detect—and if detected, measure—the reference signal transmission using one of its UE Rx beams.

As UE 205 measures each available UE Rx beam over multiple measurement occasions 220 within a given time period, UE 205 may identify, select, or otherwise determine a set of candidate UE Rx beams. For example, UE 205 may determine (e.g., identify, add, select) the UE Rx beam(s) to include in the candidate set based on each beam satisfying a candidate beam performance threshold that is (pre) configured for UE 205 or determined (e.g., autonomously) by UE 205. In some examples, the UE Rx beams included in the candidate set may be the best X UE Rx beams (e.g., X UE Rx beams having the highest RSRP or any other performance metric), where X is a positive integer. Generally, the UE Rx beams in candidate set may be the prime candidates the UE selects from when the current serving UE Rx beam drops below the serving beam threshold. In the non-limiting example illustrated in FIG. 2, beam B (Rx beam 230-a) and beam C (Rx beam 230-b) of the available UE Rx beams of UE 205 are included in the candidate set, along with other UE Rx beams.

Accordingly, UE 205 generally measures SSB reference signal transmissions from network entity 210 during measurement occasions 220 to ensure the serving UE Rx beam (e.g., beam A, Rx beam 225) performance as well as maintain a set of candidate UE Rx beams (e.g., at least Rx beam B 230-a and Rx beam C 230-b. although other UE Rx beams may be included in the candidate set). However, measurement occasions 220 are generally limited in the time domain and conventional techniques do not provide a mechanism for UE 205 to prioritize candidate UE Rx beams in the set of candidate UE Rx beams.

For example and in the non-limiting example where UE 205 is operating in a 5G-NR mmW connected mode, it may be helpful to optimally allocate measurement opportunities across multiple UE Rx beams for proper beam refinement, as well as for staying on the optimal serving UE Rx beam. The measurements opportunities (e.g., measurement occasions 220) are divided between new UE Rx beam detection (e.g., available UE Rx beams, but not candidate beams) as well as updating already detected/measured UE Rx beams (e.g., the current serving beam as well as candidate set beams). In conventional wireless networks, the scheduling scheme for the already detected UE Rx beams is generally best described as a best-effort approach. This best-effort approach is generally sufficient to avoid starvation, but does not prioritize any regular cadence (e.g., measurement opportunities) to any beam, even if it's sufficiently strong (such as among the candidate UE Rx beams).

This best-effort approach is generally sub-optimal for beam reporting, such as due to a reliance on instantaneous, filtered or stale measurements from irregular and best-effort scheduling. If the serving UE Rx beam's performance metrics degrade, the UE Rx beams that may no longer be good candidates may still qualify as candidate for beam switching (e.g., due to stale performance metrics), which may adversely impact throughput, result in beam failure, a loss in communications, and the like. This is because finding the optimal serving UE Rx beam might be delayed as the UE Rx beams that may be optimal candidates for beam switching are not prioritized is any manner during the measurement occasions 220. Using such best-effort approach, UE 205 may have to utilize more measurement occasions 220 to find the optimal UE Rx beam, thus wasting time and power.

More particularly, in the situation where the performance metrics of Beam A drops, UE 205 may perform beam switching to a stale UE Rx Beam (e.g., a UE Rx beam that has not been measured within a threshold time period), which may have also degraded by that point. Thus, UE 205 would remain on a sub-optimal UE Rx beam until there is an opportunity to measure a better performing candidate UE Rx beam.

Aspects of the technique described herein may include various mechanisms for UE 205 to prioritize certain candidate UE Rx beams during measurement occasions 220 in order to improve beam measurement or management (e.g., to improve beam switching). Broadly, this may include UE 205 determining (measuring, identifying, selecting) a Class 3 set of candidate UE Rx beams that may be considered the best among the candidate beams and prioritizing scheduling of measurements for those class 3 candidate beams across a subset of measurement occasions 220. With such techniques, the best performing candidate beams (such as beams B and C) may be scheduled with dedicated opportunities for measurements, thus resolving the staleness concerns and maintaining a more updated set of candidate beams for beam switching when the serving UE Rx beam degrades. With a greater number of UE Rx beams, the improvement associated with such techniques may be significant. In some examples where there are a threshold number of measurement occasions 220, the ability to measure 3 UE Rx beams per SSB may be achieved (e.g., N may be increased to 3).

For example, UE 205 may measure a reference signal during a first subset of measurement occasions using its serving UE Rx beam. In this non-limiting example, the serving beam (or rather the current serving beam) of UE 205 is beam A, which corresponds to Rx beam 225. The first subset of measurement occasions 220 in this example include UE 205 measuring a reference signal during measurement occasion 220-a, during measurement occasion 220-e, and so forth. That is, the periodicity or how frequently UE 205 measures the reference signal using its serving UE Rx beam in this example is every fifth (5th) measurement occasion 220, although it is to be understood that other periodicities may be employed. In addition, it should be understood that measurement occasions 220 may not be present in each time period (e.g., slot, subframe). Accordingly and based on the periodicity of the serving beam measurements, UE 205 may maintain current (e.g., within the periodicity of measurements for the serving UE Rx beam) performance metrics of its serving beam.

UE 205 may also measure the reference signal during a second subset of measurement occasions 220 using a first subset of candidate UE Rx beams (e.g., the Class 3 candidate beams) of the set of candidate UE Rx beams. That is, UE 205 may determine a set of candidate UE Rx beams. Among the set of candidate UE Rx beams, UE 205 may identify the first subset of candidate UE Rx beams based on the best performing (e.g., associated with the best performance metrics) UE Rx beams in the set of candidate UE Rx beams. In the non-limiting example illustrated in FIG. 2, beams B (e.g., Rx beam 230-a) and C (e.g., Rx beam 230-b) within the set of candidate UE Rx beams are generally identified as the first subset of candidate UE Rx beams from the candidate set.

In some aspects, UE 205 may include, select, add, or otherwise determine the UE Rx beams to be included in the first subset of candidate UE Rx beams (e.g., the Class 3 candidate beams) based on the performance of those UE Rx beams. For example, UE 205 may be (pre) configured with (e.g., using RRC signaling) and/or determine (e.g., autonomously) a serving beam performance threshold that may be used to select the serving UE Rx beam. UE 205 may also be (pre) configured with (e.g., using RRC signaling) or determine (e.g., autonomously) a candidate beam performance threshold. This candidate beam performance threshold may be the threshold used to determine which—among all of the available UE Rx beams of UE 205—are to be included in the set of candidate UE Rx beams. However, UE 205 may also be (pre) configured with (e.g., using RRC signaling) or determine (e.g., autonomously) a Class 3 performance threshold (e.g., a performance threshold value relative to the serving UE Rx beam threshold value, such as within 1 dB, 3, dB, etc.). The Class 3 performance threshold may generally be a threshold between the serving beam performance level and the candidate beam performance threshold. Accordingly, UE 205 may add candidate UE Rx beams having or otherwise associated with satisfying the Class 3 performance threshold to the first subset of candidate UE Rx beams, but not candidate UE Rx beams satisfying the candidate beam performance threshold while not satisfying the Class 3 performance threshold.

In some aspects, UE 205 may update or otherwise maintain the Class 3 beams in the first subset of candidate UE Rx beams (e.g., add and/or remove beams). For example, when UE 205 identifies or otherwise determines that the performance metrics of a candidate UE Rx beam from the second subset of candidate UE Rx beams now satisfy the Class 3 performance threshold, UE 205 may add that beam to the Class 3 candidate list. Similarly, when UE 205 determines that the performance metrics of a candidate UE Rx beam from the first subset of candidate UE Rx beams (e.g., a Class 3 candidate beam) now fails to satisfy the Class 3 performance threshold, UE 205 may remove that beam (e.g., demote the beam to the second subset of candidate UE Rx beams). In some examples, UE 205 may determine how may beams are included in the candidate Class 3 candidate beam list. For example, the number of beams to be included in the first subset of candidate UE Rx beams may be based on how many measurement occasions are available. For example, when there are more than three available measurement occasions 220 within a serving beam measurement periodicity 235 time period, UE 205 may measure the reference signal using two or more beams in the Class 3 candidate beam list.

The second subset of measurement occasions 220 in this non-limiting example may generally correspond to measurement occasion 220-b during which Rx beam B 230-a is used to measure the reference signal and measurement occasion 220-f during which Rx beam C 230-b is used to measure the reference signal. Accordingly, the measurement occasions 220 that UE 205 measures the reference signal to determine the performance metrics of the UE Rx beams in the first subset of candidate UE Rx beams is increased relative to other UE Rx beams in the candidate set.

In some examples, there may be at least one measurement occasion 220 scheduled, available, or otherwise used for measuring a beam from the first subset of candidate UE Rx beams for each instance of the serving beam measurement periodicity 235. For example, UE 205 may schedule measurement of at least one (e.g., or more when more beams can be measured per measurement occasion) Class 3 candidate beam during each serving beam measurement periodicity 235. This provides a mechanism for UE 205 to identify the best candidate UE Rx beam(s) among the candidate set and schedule measurements using those beams more frequently to avoid stale or outdated metrics for those beams.

UE 205 may also measure the reference signal during a third subset of measurement occasions 220 using a second subset of candidate UE Rx beams (e.g., the remaining candidate UE Rx beams such as Rx beam D 230-c or Rx beam E 230-d) of the set of candidate UE Rx beams. As discussed, UE 205 determine a set of candidate UE Rx beams. The first subset of candidate UE Rx beams generally corresponds to the best performing Rx beams in the candidate set, with the second subset of candidate UE Rx beams generally corresponding to the other UE Rx beams in the candidate set.

The third subset of measurement occasions 220 generally include measurement occasion 220-c, measurement occasion 220-d, and/or measurement occasion 220-g. During these measurement occasions 220, UE 205 may use the candidate UE Rx beams and/or other available UE Rx beams to measure the reference signal transmissions from network entity 210 to maintain the candidate set and/or to add/remove UE Rx beams from the candidate set.

In some examples, non-starvation techniques may be applied when scheduling measurements during the measurement occasions 220. For example, UE 205 may determine a first measurement threshold number of times in which the first subset of candidate UE Rx beams (e.g., the Class 3 beams) are measured. Similarly, UE 205 may determine a second measurement threshold number of times in which the second subset of candidate UE Rx beams (e.g., the non-Class 3 candidate beams) are measured.

UE 205 may perform beam switching based on such measurements. For example, UE 205 may identify or otherwise determine that the performance metric of its serving UE Rx beam has degraded below the serving beam performance threshold. Accordingly, UE 205 may select a new serving UE Rx beam from the candidate set based on such measurements. In some examples (e.g., depending on the measurement results), this may include UE 205 switching from the current serving beam (e.g., beam A in this example) to a beam from the first subset of candidate UE Rx beams (e.g., beam B or beam C in this example). In other examples, this may include UE 205 switching from the current serving beam (beam A in this example) to a beam from the second subset of candidate UE Rx beams (e.g., a non-Class 3 candidate beam).

Accordingly, aspects of the described techniques provide a novel technique that prioritizes measurements for a few already detected UE Rx beams having performance metrics above a certain threshold (e.g., the Class 3 candidate beams). For each SSB (e.g., for each measurement occasion 220), UE 205 may maintain candidate UE Rx beams in the Class 3 list that are within Y dB of the serving UE Rx beam (e.g., in terms of RSRP metric). The Class 3 list may be sorted with respect to the RSRP of each candidate UE Rx beam in the Class 3 list (e.g., to further prioritize the best candidate beams). UE Rx beams from the Class 3 list may be given dedicated measurement opportunities by scheduling them with the same cadence (e.g., periodicity) as the serving UE Rx beam on per-SSB basis.

In some aspects, between the periodic serving UE Rx Beam measurement occasions, a maximum of N Class 3 beams may be scheduled, with at least one Class 3 UE Rx beam getting one opportunity (e.g., used to measure at least one Class 3 beam using the reference signal at least once) during the same periodicity as the current serving UE Rx beam (e.g., according to the serving beam measurement periodicity 235).

After prioritizing the Class 3 UE Rx beams during the second subset of the available measurement occasions 220, the remaining detected UE Rx beams (e.g., the other candidate UE Rx beams, which were not included in the Class 3 list) may be scheduled for measurement opportunities during the third subset of measurement occasions (e.g., measurement occasion 220-c, measurement occasion 220-d, and/or measurement occasion 220-g). A non-starvation scheme may be applied for the other candidate UE Rx beams across the third subset of measurement occasions. Accordingly, without utilizing any extra measurement occasions 220, the techniques described herein prioritizes good beams (e.g., the Class 3 candidate beams), facilitating faster serving UE Rx beam switching, maintaining good throughput, and saving power.

Figure 3:
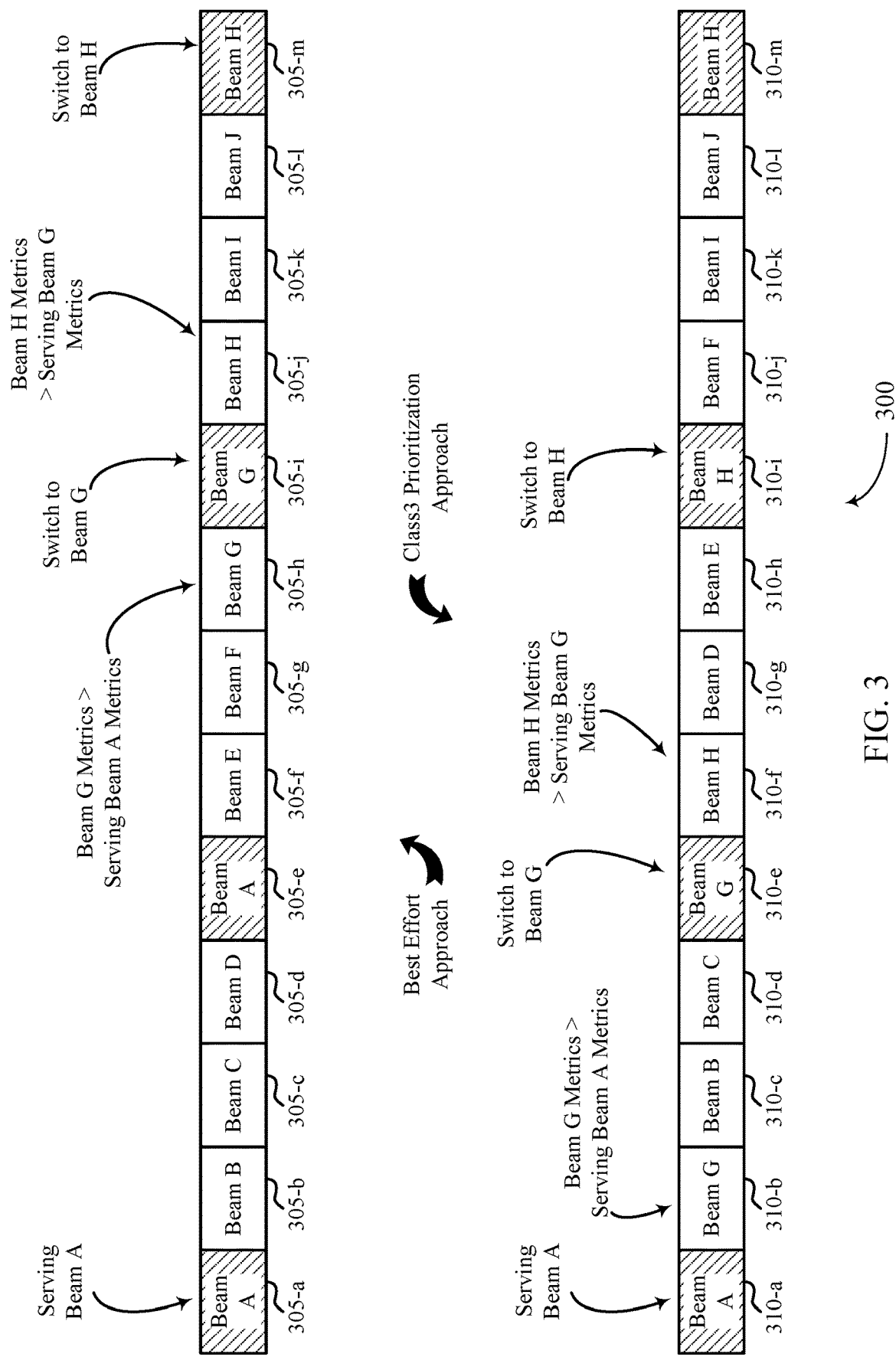
FIG. 3 illustrates an example of a measurement configuration that supports user receive beam measurement prioritization in accordance with one or more aspects of the present disclosure.

FIG. 3 illustrates an example of a measurement configuration 300 that supports user receive beam measurement prioritization in accordance with one or more aspects of the present disclosure. Measurement configuration 300 may implement aspects of wireless communication systems 100 and/or 200. Aspects of measurement configuration 300 may be implemented at or implemented by a UE and/or network entity, which may be examples of the corresponding devices described herein. Broadly, measurement configuration 300 illustrates an example of a best-effort approach and an example of a Class 3 prioritization approach when scheduling measurement occasions.

As discussed above, aspects of the techniques described herein provide various mechanisms for a UE to utilize beam detection and management techniques to improve beamformed communications. For example, the UE may support using a UE Rx beam for beamformed communications received from a network entity or other wireless device. Each UE Rx beam may generally correspond to a directional reception configuration of the UE where the UE configures one or more antennas, antenna panels, antenna configurations, antenna panel configurations, and the like, of the UE in order to steer the reception in a particular direction. In some aspects, the UE may have performed various beam detection/measurement procedures to measure, identify, quantify, or otherwise determine the performance metric (e.g., RSRP, throughput, interference, latency, etc.) of each available UE Rx beam. In the non-limiting example illustrated in FIG. 3, the UE may be configured with ten (10) available UE Rx beams, which include beam A, beam B, beam C, beam D, beam E, beam F, beam G, beam H, beam I, and beam J. It is to be understood that the UE may be configured with or otherwise support a different number of available UE Rx beams.

The UE may have previously identified a serving UE Rx beam as well as a set of candidate UE Rx beams (e.g., using such previous beam detection and management functions). In some examples, the UE may schedule measurement occasions 305 for the serving UE Rx beam and the UE Rx beams in the candidate UE Rx beams based on a specific order (e.g., A-n), an associated index value (e.g., 0-n), and the like. In the non-limiting example illustrated in FIG. 3, this may include the UE using beam A as the current serving UE Rx beam and beams B-J being in the set of candidate UE Rx beams. However, the UE may have also determined that at least beams B and H are the best performing beams among the candidate set (e.g., have a performance level within a threshold such as X dB of the performance level of the serving UE Rx beam). Nevertheless, the UE may schedule or otherwise allocate measurement occasions 305 according to the beam index/number, rather than considering the performance metric of each candidate UE Rx beam.

According to such best-effort approach scheduling, this may include the UE scheduling measurement occasion 305-a, measurement occasion 305-e, measurement occasion 305-i, and measurement occasion 305-m, to use the current serving UE Rx beam to measure the reference signal. This may result in a serving beam measurement periodicity of 4, where the current serving UE Rx beam is used to measure the reference signal every fourth measurement occasions. Based on a non-starvation approach, the UE may use beam B to measure the reference signal during measurement occasion 305-b, use beam C to measure during measurement occasion 305-c, use beam D to measure during measurement occasion 305-d, use beam E to measure during measurement occasion 305-f, use beam F to measure during measurement occasion 305-g, and use beam G to measure during measurement occasion 305-h.

However and based on the measurement of beam G during measurement occasion 305-h, the UE may determine that the performance metrics of its serving UE Rx beam have degraded such that now the performance metrics of beam G are better. Accordingly, the UE may beam switch from beam A to beam G as the new serving UE Rx beam. For example, the UE may beam switch from beam A to beam G and use beam G to measure the reference signal during measurement occasion 305-i since beam G is the new serving UE Rx beam. Continuing with the best-effort approach, the UE may use beam H to measure the reference signal during measurement occasion 305-j, use beam I to measure during measurement occasion 305-k, use beam J to measure during measurement occasion 305-1.

However and based on the measurement of beam H during measurement occasion 305-j, the UE may determine that the performance metrics of its serving UE Rx beam have degraded such that now the performance metrics of beam H are better. Accordingly, the UE may beam switch from beam G to beam H as the new serving UE Rx beam. For example, the UE may beam switch from beam G to beam H and use beam H to measure the reference signal during measurement occasion 305-m since beam H is the new serving UE Rx beam.

Accordingly, in this best-effort approach the current serving UE Rx beam is A initially, which is measured periodically. UE Rx beams G and H were previously measured and determined to have good performance metrics. However, in this best-effort approach for scheduling measurement occasions 305 using UE Rx beams B to J (e.g., in-order scheduling), it takes some time to measure beams G and H and finally switch the serving UE Rx beam to H. More particularly, this best-effort approach takes 13 measurement occasions 305 before the UE finally settles on its best performing candidate beam H as the current serving UE Rx beam.

However, aspects of the techniques described herein provide for a Class 3 prioritization approach where prioritizing UE Rx beams G and H allows the UE to beam switch to the best serving UE Rx beam in less time. This approach leverages the past measurements to improve the likelihood of finding the best candidate UE Rx beam.

In this non-limiting example of the Class 3 prioritization approach, the UE may again initially begin with beam A as the current serving UE Rx beam and may also have determined that beams G and H are the best performing candidate UE Rx beams. Accordingly, the UE may have allocated beams B and H to a first subset of the set of candidate UE Rx beams and the other beams (e.g., beams B-F, I and J) to a second subset of the set of candidate UE Rx beams. The UE may use the serving UE Rx beam to measure the reference signal during measurement occasion 310-a, during measurement occasion 310-e, during measurement occasion 310-i, during measurement occasion 310-m, and so on (e.g., during a first subset of a set of measurement occasions 310). Again, the serving beam measurement periodicity is four, with the serving beam being used to measure the reference signal every fourth (4th) measurement occasion 310.

However, the UE may use the first subset of candidate UE Rx beams to measure the reference signal during a second subset of the set of measurement occasions 310. As discussed, the first subset of candidate UE Rx beams may correspond to the UE Rx beams having performance metrics satisfying a performance threshold (e.g., the Class 3 performance threshold). The Class 3 performance threshold in this example may be relative to the serving beam performance level of the serving beam (e.g., within 1 dB, within 3 dB, etc.). Accordingly, the UE may schedule the candidate UE Rx beams in the first subset such that at least one beam of the first subset of candidate UE Rx beams is used to measure the reference signal during each serving beam measurement periodicity. This may include the UE using beam G to measure the during the measurement occasion 310-b since beam G is in the first subset of candidate UE Rx beams. Based on this measurement, the UE may determine that the performance metrics of the current serving beam (e.g., beam A) have degraded such that the performance metrics of beam G are better. The UE may demote beam A to the candidate UE Rx beam list or list beam A as an un-detected beam, depending on the performance metrics of beam A.

The UE may use a third subset of candidate UE Rx beams to measure the reference signal during a third subset of the set of measurement occasions. The candidate UE Rx beams in the third subset of candidate UE Rx beams may include other available UE Rx beams that do not satisfy the Class 3 performance threshold (e.g., may not be within 1 dB or 3 dB of the serving beam performance metrics), but do satisfy the candidate beam performance threshold and therefore be included in the set of candidate UE Rx beams. For example, the UE may use beam B to measure the reference signal during measurement occasion 310-c and use beam C to measure during measurement occasion 310-d. As the UE has switched to beam G as the serving beam, the UE may use beam G to measure the reference signal during measurement occasion 310-e.

Again, the Class 3 prioritization approach includes the UE measuring the reference signal using the first subset of candidate UE Rx beams during the second subset of the set of measurement occasions 310. As beam H is included in the Class 3 list, this may include the UE using beam H to measure the reference signal during measurement occasion 310-f. Based on this measurement, the UE may determine that the performance metrics of its current serving beam (e.g., beam G at this point) has degraded such that the performance metrics of beam H are better. The UE may use beam D to measure the reference signal during measurement occasion 310-g and use beam E to measure during measurement occasion 310-h. As the UE has switched to beam H as the serving beam, the UE may use beam H to measure the reference signal during measurement occasion 310-i.

The UE may use beam F to measure the reference signal during measurement occasion 310-j, use beam I during to measure during measurement occasion 310-k, and use beam J to measure during measurement occasion 310-1. As beam H is still the serving UE Rx beam, the UE may again use beam H to measure the reference signal during measurement occasion 310-m.

Accordingly, the UE may measure a reference signal (e.g., a SSB reference signal transmitted from a network entity) using the serving UE Rx beam during a first subset of measurement occasions. The UE may also measure the reference signal using a first subset of candidate beams during a second subset of the set of measurement occasions and then use the remaining measurement occasions to measure the non-Class 3 beams (e.g., the second subset of candidate UE Rx beams).

Although FIG. 3 illustrates a single Rx beam being measured during each measurement occasion, in some cases multiple Rx beams may be measured in each measurement occasion. In some cases, a quantity of beams in the first subset of candidate beams may be given by an integer times the number of Rx beams measured in each measurement occasion, such that over the integer number of measurement periods of the serving beam, each beam of the first subset of candidate beams may be measured. It should be understood that although measurement occasions 305 and 310 are shown as contiguous, measurement occasions 305 and 310 may be separated from each other in time (e.g., may have a measurement occasion periodicity, with other time periods such as symbols, slots, or subframes in between that are not shown for clarity).

Figure 4:
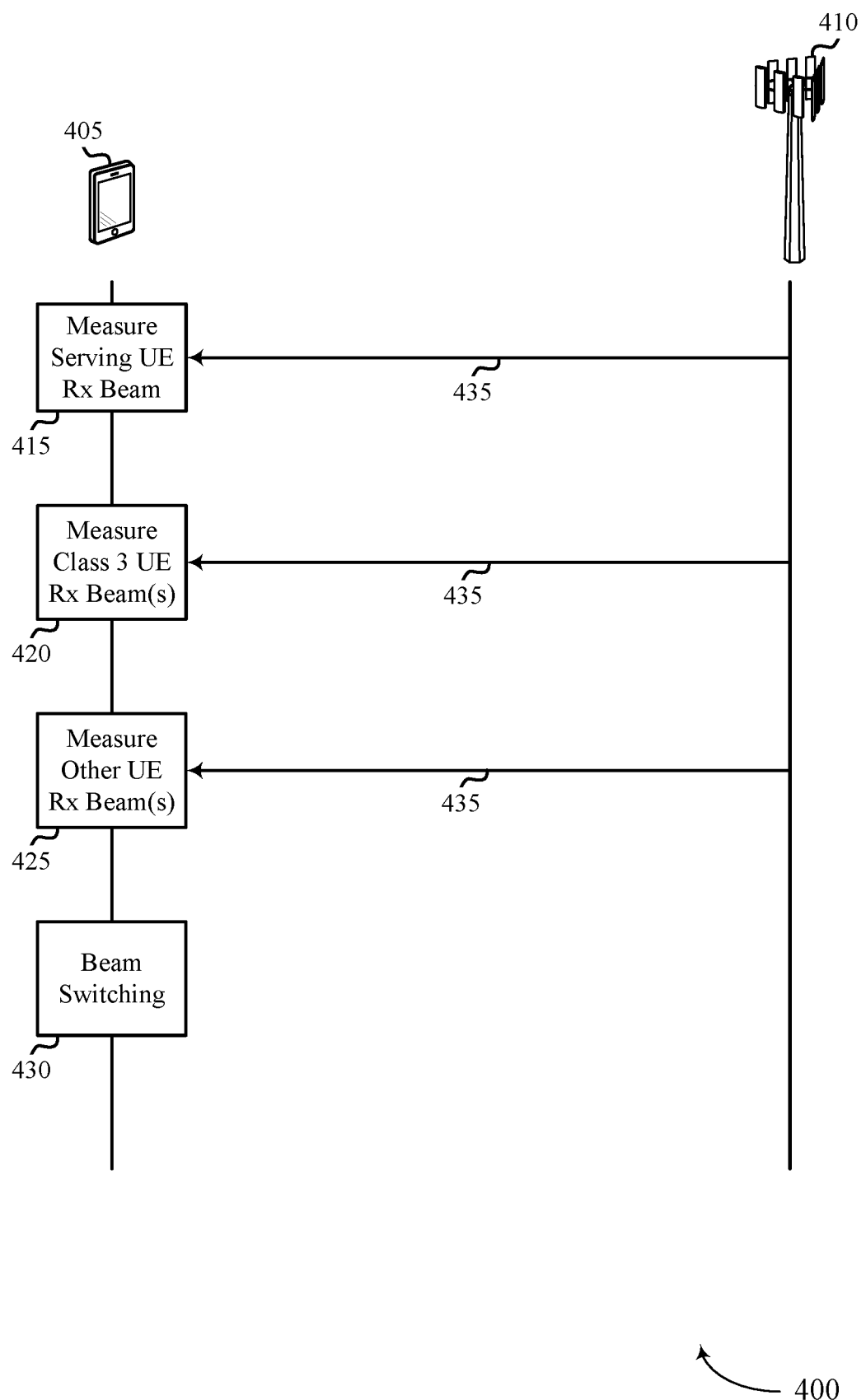
FIG. 4 illustrates an example of a process that supports user receive beam measurement prioritization in accordance with one or more aspects of the present disclosure.

FIG. 4 illustrates an example of a process 400 that supports user receive beam measurement prioritization in accordance with one or more aspects of the present disclosure. Aspects of process 400 may implement aspects of wireless communication systems 100 and/or 200 and/or aspects of measurement configuration 300. Aspects of process 400 may be implemented at or implemented by a UE 405 and/or a network entity 410, which may be examples of the corresponding devices described herein.

At 415, UE 405 may measure a reference signal 435. In some examples, the reference signal 435 may include a SSB reference signal transmitted by network entity 410. In some examples, UE 405 may use a serving UE Rx beam to measure the reference signal 435. In some examples, UE 405 may measure the reference signal over a first subset of measurement occasions. In some examples, UE 405 may use the serving UE Rx beam to measure the reference signal 435 according to a serving beam measurement periodicity. In some examples, the number of measurement occasions in the set of measurement occasions may be based on the number of measurement occasions within a given period of the serving beam measurement periodicity.

At 420, UE 405 may measure the reference signal 435. In some examples, UE 405 may use a first subset of candidate UE Rx beams to measure the reference signal 435. In some examples, the first subset of candidate UE Rx beams may include a Class 3 beam list. In some examples, the first subset of candidate UE Rx beams may include beams having a performance metric, such as a Class 3 performance metric. In some examples, the performance metric may be relative to a serving UE receive beam. In some examples, this may include the performance metric of the first subset of candidate UE Rx beams being within x dB of the performance metric of the serving UE Rx beam, where x is a positive number. In some examples, UE 405 may use the first subset of candidate UE Rx beams to measure the reference signal 435 during a second subset of the set of measurement occasions. In some examples, the second subset of measurement occasions may include at least one measurement occasion within each time period of the serving beam measurement periodicity.

At 425, UE 405 may measure the reference signal 435. In some examples, UE 405 may use a second subset of candidate UE Rx beams to measure the reference signal 435. In some examples, the second subset of candidate UE Rx beams may include any non-Class 3 beams, such as the other available/candidate UE Rx beams. In some examples, the second subset of candidate UE Rx beams may include beams failing to satisfy the performance metric. In some examples, the performance metric may be relative to a serving UE receive beam. In some examples, this may include the performance metric of the second subset of candidate UE Rx beams not being within x dB of the performance metric of the serving UE Rx beam, where x is a positive number.

At 430, UE 405 may perform beam switching. In some examples, the beam switching may be to a candidate beam of the set of candidate UE Rx beams. In some examples, the beam switching may be to a candidate beam in the first subset of candidate UE Rx beams. In some examples, the beam switching may be to a candidate beam in the second subset of candidate UE Rx beams. In some aspects, UE may perform the beam switching based on the results of the measurements, such as the measurements performed at 415, at 420, and/or at 425.

Figure 5:
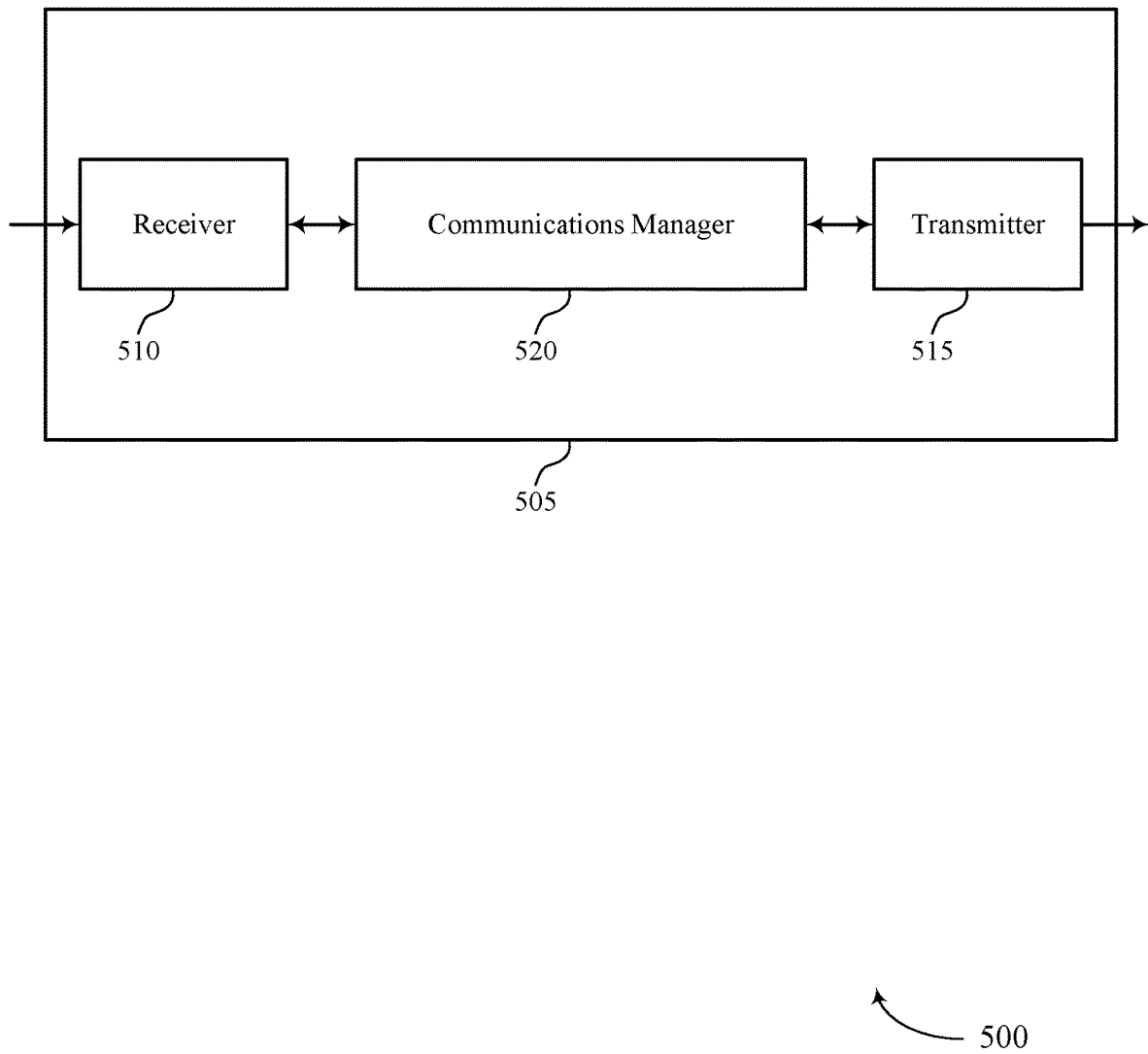
FIGS. 5 and 6 show block diagrams of devices that support user receive beam measurement prioritization in accordance with one or more aspects of the present disclosure.

FIG. 5 shows a block diagram 500 of a device 505 that supports user receive beam measurement prioritization in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to user receive beam measurement prioritization). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to user receive beam measurement prioritization). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of user receive beam measurement prioritization as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. For example, the communications manager 520 may be configured as or otherwise support a means for measuring a reference signal over a first subset of a set of measurement occasions using a serving UE receive beam according to a serving beam measurement periodicity. The communications manager 520 may be configured as or otherwise support a means for measuring the reference signal over a second subset of the set of measurement occasions using a first subset of candidate UE receive beams of a set of candidate UE receive beams, each candidate UE receive beam in the first subset of candidate UE receive beams satisfying a performance threshold relative to the serving UE receive beam. The communications manager 520 may be configured as or otherwise support a means for measuring the reference signal over a third subset of the set of measurement occasions using a second subset of candidate UE receive beams of the set of candidate UE receive beams, each candidate UE receive beam in the second subset of candidate UE receive beams failing to satisfy the performance threshold relative to the serving UE receive beam. The communications manager 520 may be configured as or otherwise support a means for performing beam switching to a candidate UE receive beam of the set of candidate UE receive beams based on a result of measuring the reference signal.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for improved beam switching techniques based on a Class 3 beam list being afforded a certain number of measurement occasions to ensure current performance metric information.

Figure 6:
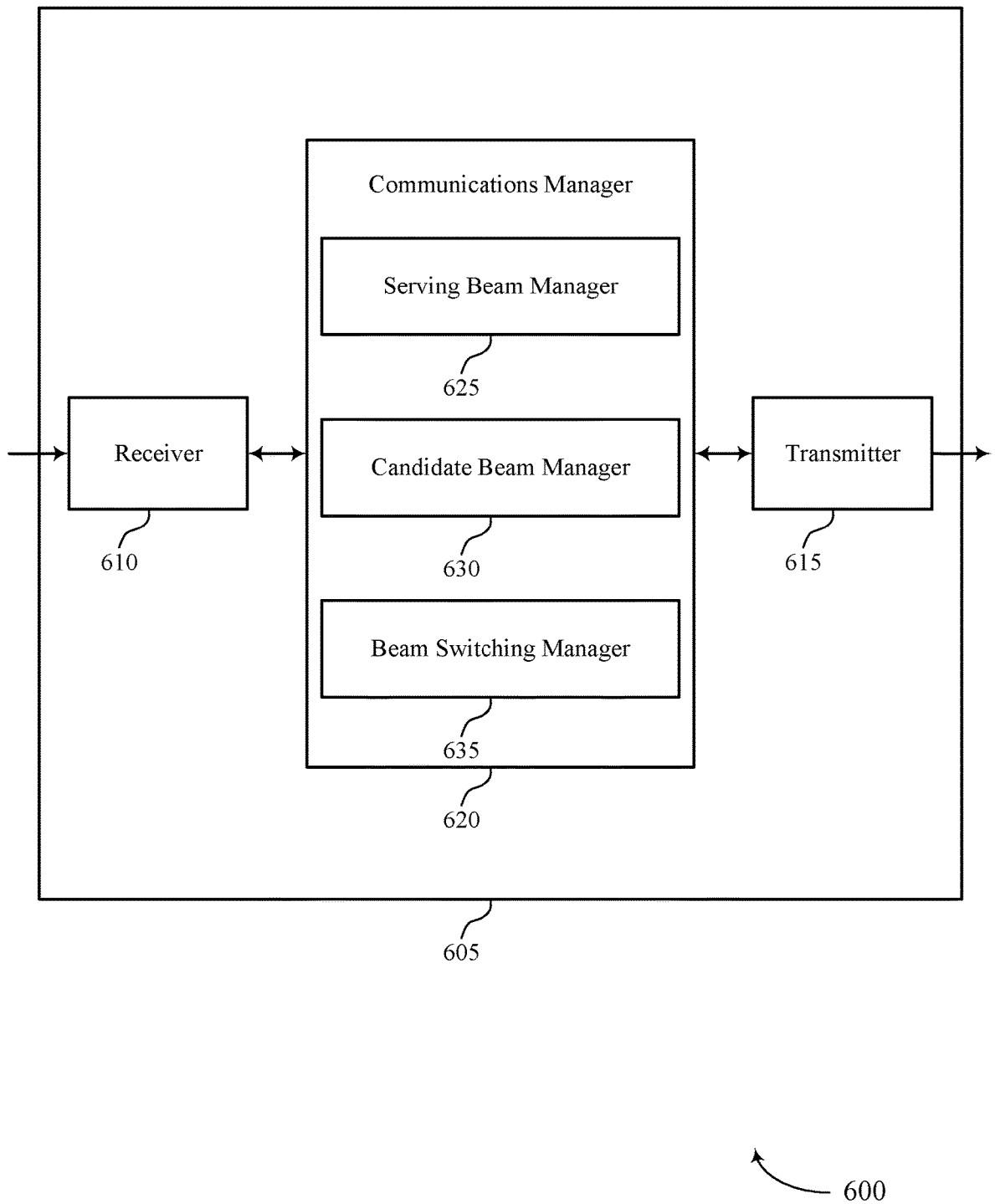

FIG. 6 shows a block diagram 600 of a device 605 that supports user receive beam measurement prioritization in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to user receive beam measurement prioritization). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to user receive beam measurement prioritization). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of user receive beam measurement prioritization as described herein. For example, the communications manager 620 may include a serving beam manager 625, a candidate beam manager 630, a beam switching manager 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The serving beam manager 625 may be configured as or otherwise support a means for measuring a reference signal over a first subset of a set of measurement occasions using a serving UE receive beam according to a serving beam measurement periodicity. The candidate beam manager 630 may be configured as or otherwise support a means for measuring the reference signal over a second subset of the set of measurement occasions using a first subset of candidate UE receive beams of a set of candidate UE receive beams, each candidate UE receive beam in the first subset of candidate UE receive beams satisfying a performance threshold relative to the serving UE receive beam. The candidate beam manager 630 may be configured as or otherwise support a means for measuring the reference signal over a third subset of the set of measurement occasions using a second subset of candidate UE receive beams of the set of candidate UE receive beams, each candidate UE receive beam in the second subset of candidate UE receive beams failing to satisfy the performance threshold relative to the serving UE receive beam. The beam switching manager 635 may be configured as or otherwise support a means for performing beam switching to a candidate UE receive beam of the set of candidate UE receive beams based on a result of measuring the reference signal.

Figure 7:
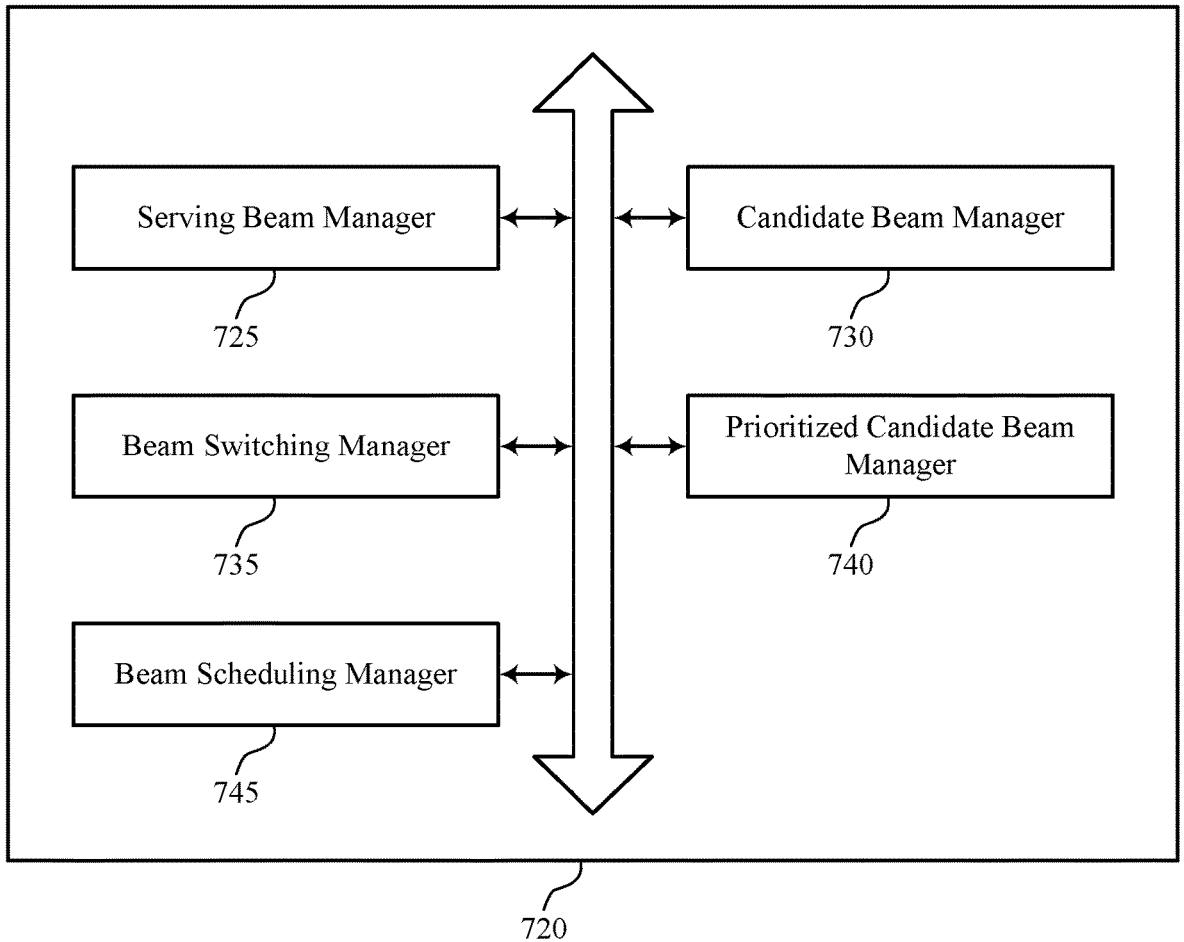
FIG. 7 shows a block diagram of a communications manager that supports user receive beam measurement prioritization in accordance with one or more aspects of the present disclosure.

FIG. 7 shows a block diagram 700 of a communications manager 720 that supports user receive beam measurement prioritization in accordance with one or more aspects of the present disclosure. The communications manager 720 may be an example of aspects of a communications manager 520, a communications manager 620, or both, as described herein. The communications manager 720, or various components thereof, may be an example of means for performing various aspects of user receive beam measurement prioritization as described herein. For example, the communications manager 720 may include a serving beam manager 725, a candidate beam manager 730, a beam switching manager 735, a prioritized candidate beam manager 740, a beam scheduling manager 745, or any combination thereof. Each of these components may communicate, directly or indirectly, with one another (e.g., via one or more buses).

The communications manager 720 may support wireless communication at a UE in accordance with examples as disclosed herein. The serving beam manager 725 may be configured as or otherwise support a means for measuring a reference signal over a first subset of a set of measurement occasions using a serving UE receive beam according to a serving beam measurement periodicity. The candidate beam manager 730 may be configured as or otherwise support a means for measuring the reference signal over a second subset of the set of measurement occasions using a first subset of candidate UE receive beams of a set of candidate UE receive beams, each candidate UE receive beam in the first subset of candidate UE receive beams satisfying a performance threshold relative to the serving UE receive beam. In some examples, the candidate beam manager 730 may be configured as or otherwise support a means for measuring the reference signal over a third subset of the set of measurement occasions using a second subset of candidate UE receive beams of the set of candidate UE receive beams, each candidate UE receive beam in the second subset of candidate UE receive beams failing to satisfy the performance threshold relative to the serving UE receive beam. The beam switching manager 735 may be configured as or otherwise support a means for performing beam switching to a candidate UE receive beam of the set of candidate UE receive beams based on a result of measuring the reference signal. In some examples, the second subset of the set of measurement occasions includes at least one measurement occasion within each time period of the serving beam measurement periodicity.

In some examples, the prioritized candidate beam manager 740 may be configured as or otherwise support a means for determining that a first candidate UE receive beam of the second subset of candidate UE receive beams satisfies the performance threshold relative to the serving UE receive beam. In some examples, the prioritized candidate beam manager 740 may be configured as or otherwise support a means for adding the first candidate UE receive beam to the first subset of candidate UE receive beams based on the determining.

In some examples, the prioritized candidate beam manager 740 may be configured as or otherwise support a means for determining, based on the adding, that a numerical quantity of candidate UE receive beams in the first subset of candidate UE receive beams exceeds a threshold quantity. In some examples, the prioritized candidate beam manager 740 may be configured as or otherwise support a means for demoting a second candidate UE receive beam associated with a second performance threshold to the second subset of candidate UE receive beams to the second subset of candidate UE receive beams.

In some examples, the beam scheduling manager 745 may be configured as or otherwise support a means for scheduling measurements during the second subset of the set of measurement occasions where each candidate UE receive beam in the first subset of candidate UE receive beams are measured a first measurement threshold number of times during the set of measurement occasions.

In some examples, the beam scheduling manager 745 may be configured as or otherwise support a means for scheduling measurements during the third subset of the set of measurement occasions where each candidate UE receive beam in the second subset of candidate UE receive beams are measured a second measurement threshold number of times during the set of measurement occasions. In some examples, each candidate UE receive beam in the second subset of candidate UE receive beams satisfy a second threshold that is different from the performance threshold. In some examples, the reference signal includes a synchronization signal block signal. In some examples, a numerical quantity of candidate UE receive beams in the first subset of candidate UE receive beans is based on a number of measurement occasions in the set of measurement occasions.

Figure 8:
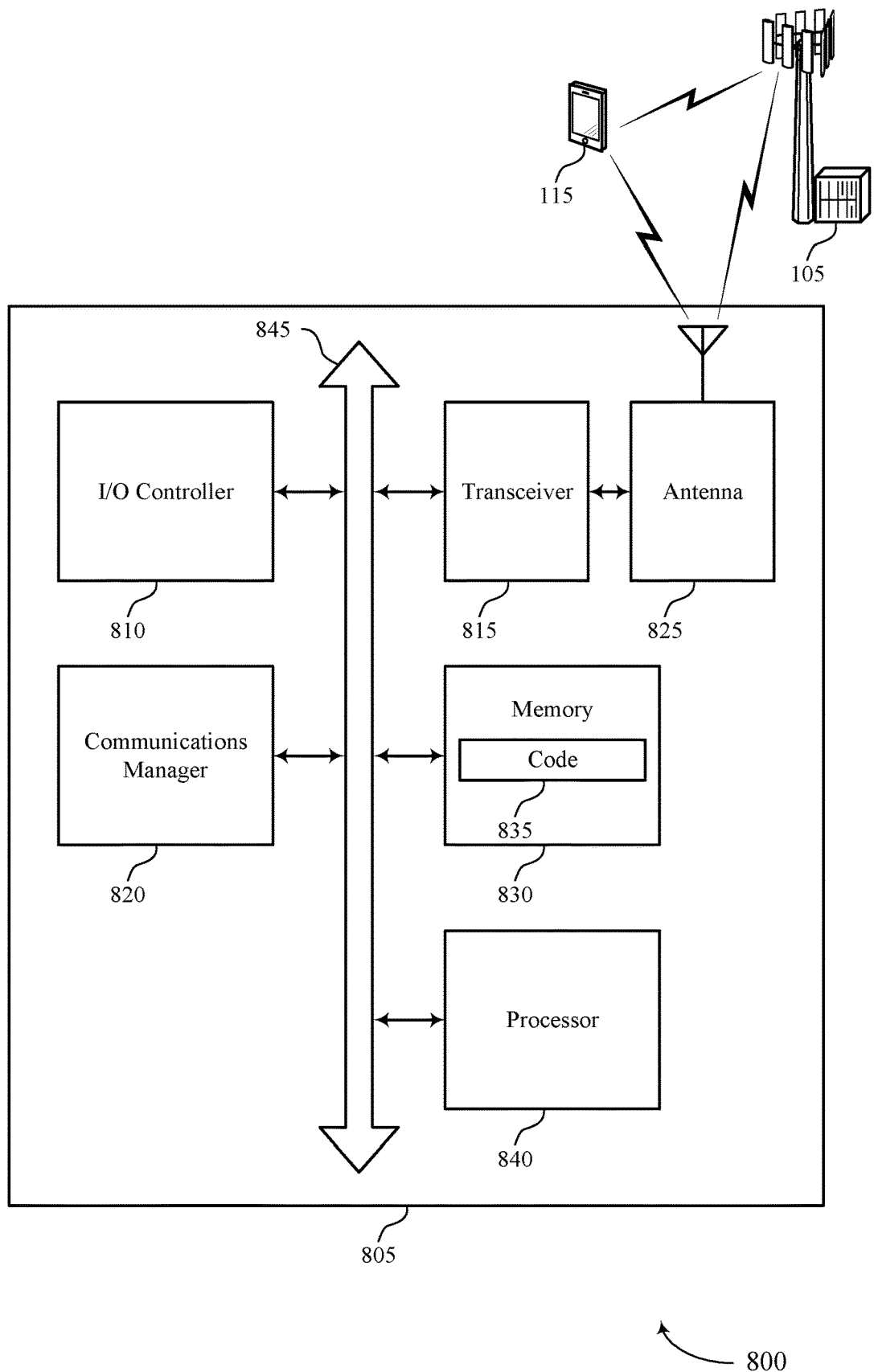
FIG. 8 shows a diagram of a system including a device that supports user receive beam measurement prioritization in accordance with one or more aspects of the present disclosure.

FIG. 8 shows a diagram of a system 800 including a device 805 that supports user receive beam measurement prioritization in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting user receive beam measurement prioritization). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for measuring a reference signal over a first subset of a set of measurement occasions using a serving UE receive beam according to a serving beam measurement periodicity. The communications manager 820 may be configured as or otherwise support a means for measuring the reference signal over a second subset of the set of measurement occasions using a first subset of candidate UE receive beams of a set of candidate UE receive beams, each candidate UE receive beam in the first subset of candidate UE receive beams satisfying a performance threshold relative to the serving UE receive beam. The communications manager 820 may be configured as or otherwise support a means for measuring the reference signal over a third subset of the set of measurement occasions using a second subset of candidate UE receive beams of the set of candidate UE receive beams, each candidate UE receive beam in the second subset of candidate UE receive beams failing to satisfy the performance threshold relative to the serving UE receive beam. The communications manager 820 may be configured as or otherwise support a means for performing beam switching to a candidate UE receive beam of the set of candidate UE receive beams based on a result of measuring the reference signal.

By including or configuring the communications manager 820 in accordance with examples as described herein, the device 805 may support techniques for improved beam switching techniques based on a Class 3 beam list being afforded a certain number of measurement occasions to ensure current performance metric information.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of user receive beam measurement prioritization as described herein, or the processor 840 and the memory 830 may be otherwise configured to perform or support such operations.

Figure 9:
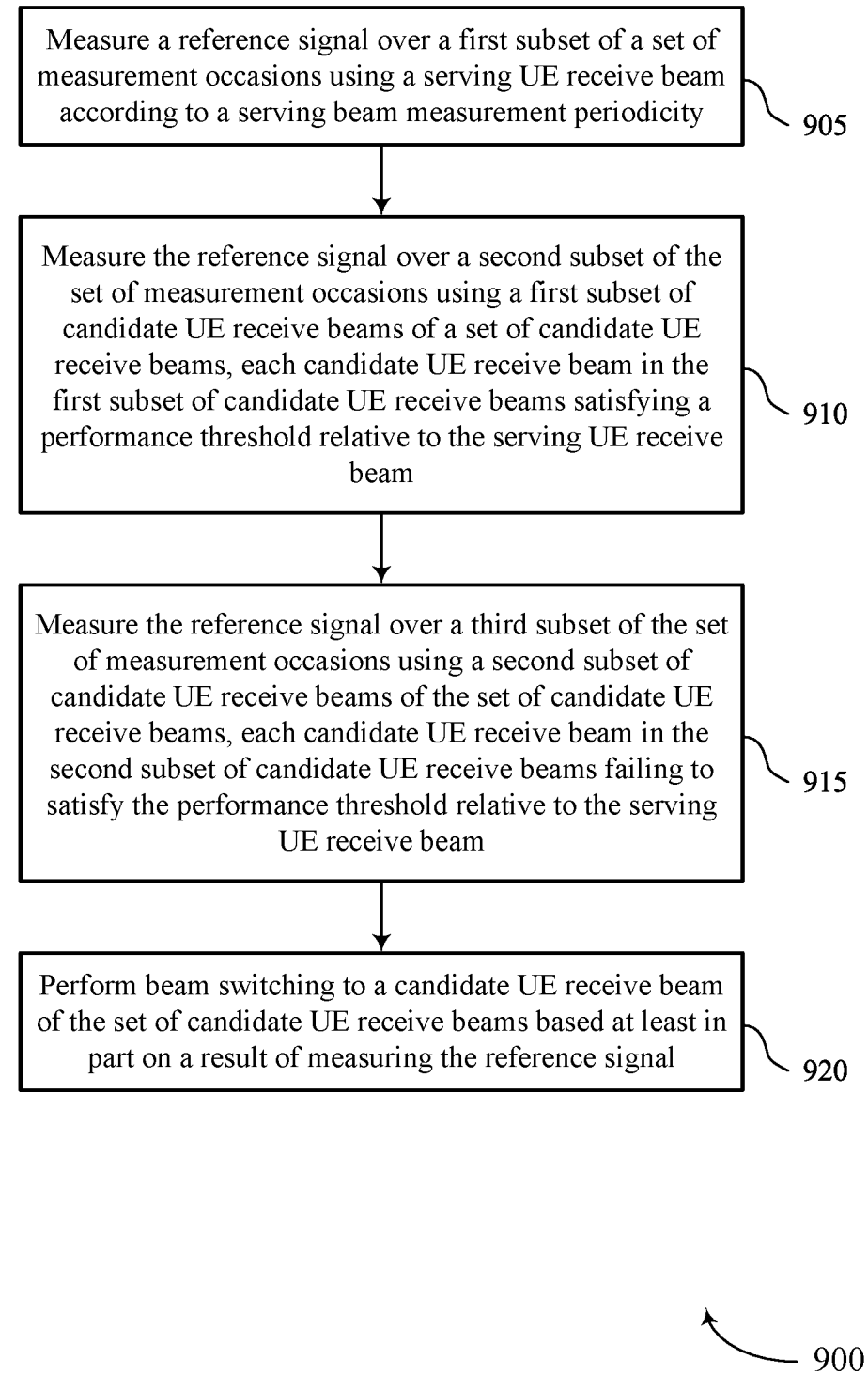
FIGS. 9 through 11 show flowcharts illustrating methods that support user receive beam measurement prioritization in accordance with one or more aspects of the present disclosure.

FIG. 9 shows a flowchart illustrating a method 900 that supports user receive beam measurement prioritization in accordance with one or more aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 905, the method may include measuring a reference signal over a first subset of a set of measurement occasions using a serving UE receive beam according to a serving beam measurement periodicity. The operations of 905 may be performed in accordance with examples as disclosed herein. In some examples, aspects of the operations of 905 may be performed by a serving beam manager 725 as described with reference to FIG. 7.

At 910, the method may include measuring the reference signal over a second subset of the set of measurement occasions using a first subset of candidate UE receive beams of a set of candidate UE receive beams, each candidate UE receive beam in the first subset of candidate UE receive beams satisfying a performance threshold relative to the serving UE receive beam. The operations of 910 may be performed in accordance with examples as disclosed herein. In some examples, aspects of the operations of 910 may be performed by a candidate beam manager 730 as described with reference to FIG. 7.

At 915, the method may include measuring the reference signal over a third subset of the set of measurement occasions using a second subset of candidate UE receive beams of the set of candidate UE receive beams, each candidate UE receive beam in the second subset of candidate UE receive beams failing to satisfy the performance threshold relative to the serving UE receive beam. The operations of 915 may be performed in accordance with examples as disclosed herein. In some examples, aspects of the operations of 915 may be performed by a candidate beam manager 730 as described with reference to FIG. 7.

At 920, the method may include performing beam switching to a candidate UE receive beam of the set of candidate UE receive beams based on a result of measuring the reference signal. The operations of 920 may be performed in accordance with examples as disclosed herein. In some examples, aspects of the operations of 920 may be performed by a beam switching manager 735 as described with reference to FIG. 7.

Figure 10:
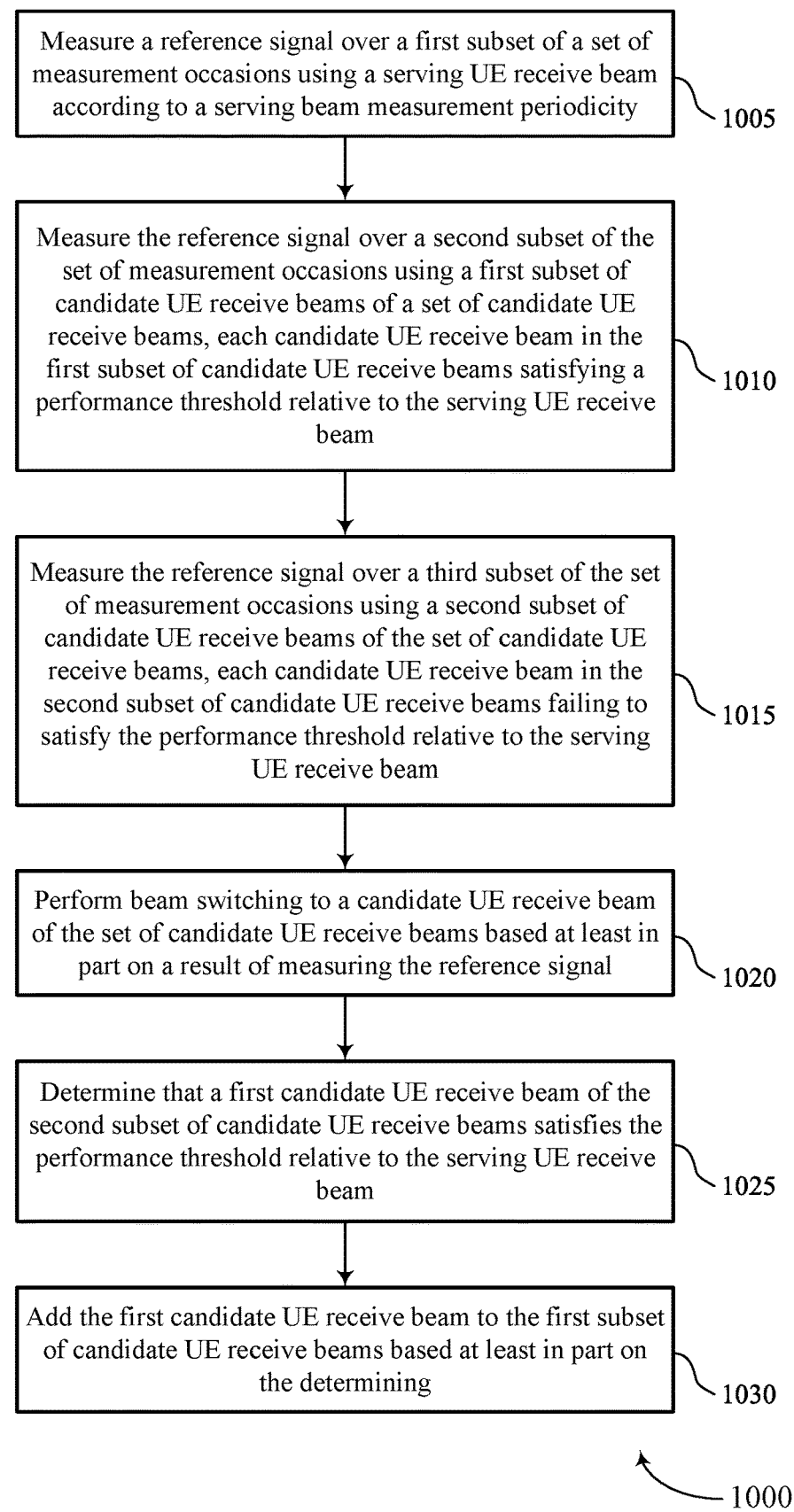

FIG. 10 shows a flowchart illustrating a method 1000 that supports user receive beam measurement prioritization in accordance with one or more aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1005, the method may include measuring a reference signal over a first subset of a set of measurement occasions using a serving UE receive beam according to a serving beam measurement periodicity. The operations of 1005 may be performed in accordance with examples as disclosed herein. In some examples, aspects of the operations of 1005 may be performed by a serving beam manager 725 as described with reference to FIG. 7.

At 1010, the method may include measuring the reference signal over a second subset of the set of measurement occasions using a first subset of candidate UE receive beams of a set of candidate UE receive beams, each candidate UE receive beam in the first subset of candidate UE receive beams satisfying a performance threshold relative to the serving UE receive beam. The operations of 1010 may be performed in accordance with examples as disclosed herein. In some examples, aspects of the operations of 1010 may be performed by a candidate beam manager 730 as described with reference to FIG. 7.

At 1015, the method may include measuring the reference signal over a third subset of the set of measurement occasions using a second subset of candidate UE receive beams of the set of candidate UE receive beams, each candidate UE receive beam in the second subset of candidate UE receive beams failing to satisfy the performance threshold relative to the serving UE receive beam. The operations of 1015 may be performed in accordance with examples as disclosed herein. In some examples, aspects of the operations of 1015 may be performed by a candidate beam manager 730 as described with reference to FIG. 7.

At 1020, the method may include performing beam switching to a candidate UE receive beam of the set of candidate UE receive beams based on a result of measuring the reference signal. The operations of 1020 may be performed in accordance with examples as disclosed herein. In some examples, aspects of the operations of 1020 may be performed by a beam switching manager 735 as described with reference to FIG. 7.

At 1025, the method may include determining that a first candidate UE receive beam of the second subset of candidate UE receive beams satisfies the performance threshold relative to the serving UE receive beam. The operations of 1025 may be performed in accordance with examples as disclosed herein. In some examples, aspects of the operations of 1025 may be performed by a prioritized candidate beam manager 740 as described with reference to FIG. 7.

At 1030, the method may include adding the first candidate UE receive beam to the first subset of candidate UE receive beams based on the determining. The operations of 1030 may be performed in accordance with examples as disclosed herein. In some examples, aspects of the operations of 1030 may be performed by a prioritized candidate beam manager 740 as described with reference to FIG. 7.

Figure 11:
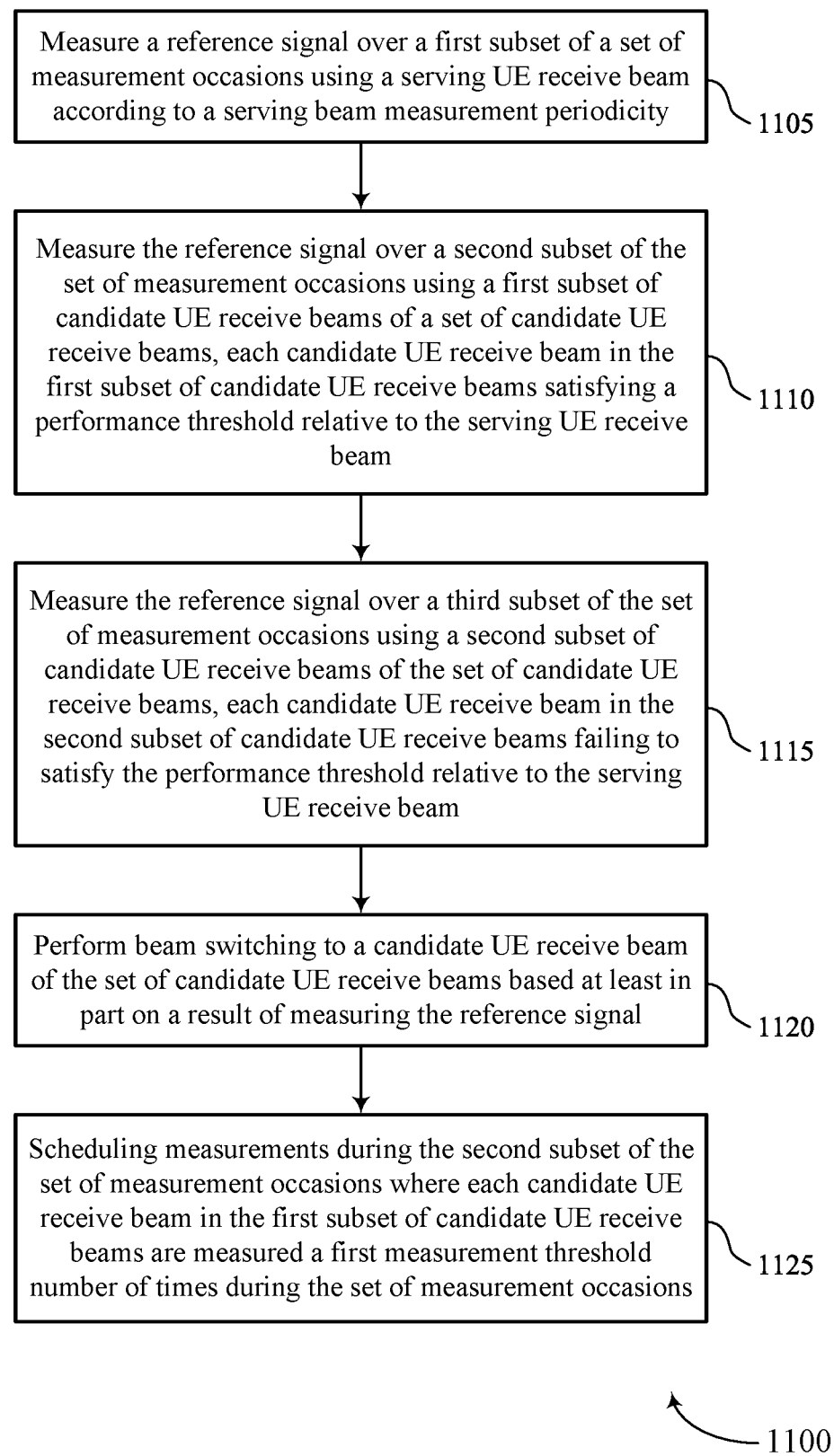

FIG. 11 shows a flowchart illustrating a method 1100 that supports user receive beam measurement prioritization in accordance with one or more aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1105, the method may include measuring a reference signal over a first subset of a set of measurement occasions using a serving UE receive beam according to a serving beam measurement periodicity. The operations of 1105 may be performed in accordance with examples as disclosed herein. In some examples, aspects of the operations of 1105 may be performed by a serving beam manager 725 as described with reference to FIG. 7.

At 1110, the method may include measuring the reference signal over a second subset of the set of measurement occasions using a first subset of candidate UE receive beams of a set of candidate UE receive beams, each candidate UE receive beam in the first subset of candidate UE receive beams satisfying a performance threshold relative to the serving UE receive beam. The operations of 1110 may be performed in accordance with examples as disclosed herein. In some examples, aspects of the operations of 1110 may be performed by a candidate beam manager 730 as described with reference to FIG. 7.

At 1115, the method may include measuring the reference signal over a third subset of the set of measurement occasions using a second subset of candidate UE receive beams of the set of candidate UE receive beams, each candidate UE receive beam in the second subset of candidate UE receive beams failing to satisfy the performance threshold relative to the serving UE receive beam. The operations of 1115 may be performed in accordance with examples as disclosed herein. In some examples, aspects of the operations of 1115 may be performed by a candidate beam manager 730 as described with reference to FIG. 7.

At 1120, the method may include performing beam switching to a candidate UE receive beam of the set of candidate UE receive beams based on a result of measuring the reference signal. The operations of 1120 may be performed in accordance with examples as disclosed herein. In some examples, aspects of the operations of 1120 may be performed by a beam switching manager 735 as described with reference to FIG. 7.

At 1125, the method may include scheduling measurements during the second subset of the set of measurement occasions where each candidate UE receive beam in the first subset of candidate UE receive beams are measured a first measurement threshold number of times during the set of measurement occasions. The operations of 1125 may be performed in accordance with examples as disclosed herein. In some examples, aspects of the operations of 1125 may be performed by a beam scheduling manager 745 as described with reference to FIG. 7.

The following provides an overview of aspects of the present disclosure:

Aspect 1: A method for wireless communication at a UE, comprising: measuring a reference signal over a first subset of a set of measurement occasions using a serving UE receive beam according to a serving beam measurement periodicity; measuring the reference signal over a second subset of the set of measurement occasions using a first subset of candidate UE receive beams of a set of candidate UE receive beams, each candidate UE receive beam in the first subset of candidate UE receive beams satisfying a performance threshold relative to the serving UE receive beam: measuring the reference signal over a third subset of the set of measurement occasions using a second subset of candidate UE receive beams of the set of candidate UE receive beams, each candidate UE receive beam in the second subset of candidate UE receive beams failing to satisfy the performance threshold relative to the serving UE receive beam; and performing beam switching to a candidate UE receive beam of the set of candidate UE receive beams based at least in part on a result of measuring the reference signal.

Aspect 2: The method of aspect 1, wherein the second subset of the set of measurement occasions includes at least one measurement occasion within each time period of the serving beam measurement periodicity.

Aspect 3: The method of any of aspects 1 through 2, further comprising: determining that a first candidate UE receive beam of the second subset of candidate UE receive beams satisfies the performance threshold relative to the serving UE receive beam; and adding the first candidate UE receive beam to the first subset of candidate UE receive beams based at least in part on the determining.

Aspect 4: The method of aspect 3, further comprising: determining, based at least in part on the adding, that a numerical quantity of candidate UE receive beams in the first subset of candidate UE receive beams exceeds a threshold quantity; and demoting a second candidate UE receive beam associated with a second performance threshold to the second subset of candidate UE receive beams to the second subset of candidate UE receive beams.

Aspect 5: The method of any of aspects 1 through 4, further comprising: scheduling measurements during the second subset of the set of measurement occasions where each candidate UE receive beam in the first subset of candidate UE receive beams are measured a first measurement threshold number of times during the set of measurement occasions.

Aspect 6: The method of any of aspects 1 through 5, further comprising: scheduling measurements during the third subset of the set of measurement occasions where each candidate UE receive beam in the second subset of candidate UE receive beams are measured a second measurement threshold number of times during the set of measurement occasions.

Aspect 7: The method of any of aspects 1 through 6, wherein each candidate UE receive beam in the second subset of candidate UE receive beams satisfy a second threshold that is different from the performance threshold.

Aspect 8: The method of any of aspects 1 through 7, wherein the reference signal comprises a SSB signal.

Aspect 9: The method of any of aspects 1 through 8, wherein a numerical quantity of candidate UE receive beams in the first subset of candidate UE receive beans is based at least in part on a number of measurement occasions in the set of measurement occasions.

Aspect 10: An apparatus for wireless communication at a UE, comprising a processor: memory coupled with the processor; and instructions stored in the memory and executable by the processor to cause the apparatus to perform a method of any of aspects 1 through 9.

Aspect 11: An apparatus for wireless communication at a UE, comprising at least one means for performing a method of any of aspects 1 through 9.

Aspect 12: A non-transitory computer-readable medium storing code for wireless communication at a UE, the code comprising instructions executable by a processor to perform a method of any of aspects 1 through 9.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   measuring a reference signal over a first subset of a set of measurement occasions using a serving UE receive beam according to a serving beam measurement periodicity;
   measuring the reference signal over a second subset of the set of measurement occasions using a first subset of candidate UE receive beams of a set of candidate UE receive beams, each candidate UE receive beam in the first subset of candidate UE receive beams satisfying a performance threshold relative to the serving UE receive beam;
   measuring the reference signal over a third subset of the set of measurement occasions using a second subset of candidate UE receive beams of the set of candidate UE receive beams, each candidate UE receive beam in the second subset of candidate UE receive beams failing to satisfy the performance threshold relative to the serving UE receive beam; and
   performing beam switching to a candidate UE receive beam of the set of candidate UE receive beams based at least in part on a result of measuring the reference signal.

2. The method of claim 1, wherein the second subset of the set of measurement occasions includes at least one measurement occasion within each time period of the serving beam measurement periodicity.

3. The method of claim 1, further comprising:
   determining that a first candidate UE receive beam of the second subset of candidate UE receive beams satisfies the performance threshold relative to the serving UE receive beam; and
   adding the first candidate UE receive beam to the first subset of candidate UE receive beams based at least in part on the determining.

4. The method of claim 3, further comprising:
   determining, based at least in part on the adding, that a numerical quantity of candidate UE receive beams in the first subset of candidate UE receive beams exceeds a threshold quantity; and
   demoting a second candidate UE receive beam associated with a second performance threshold to the second subset of candidate UE receive beams to the second subset of candidate UE receive beams.

5. The method of claim 1, further comprising:
   scheduling measurements during the second subset of the set of measurement occasions where each candidate UE receive beam in the first subset of candidate UE receive beams are measured a first measurement threshold number of times during the set of measurement occasions.

6. The method of claim 1, further comprising:
   scheduling measurements during the third subset of the set of measurement occasions where each candidate UE receive beam in the second subset of candidate UE receive beams are measured a second measurement threshold number of times during the set of measurement occasions.

7. The method of claim 1, wherein each candidate UE receive beam in the second subset of candidate UE receive beams satisfy a second threshold that is different from the performance threshold.

8. The method of claim 1, wherein the reference signal comprises a synchronization signal block signal.

9. The method of claim 1, wherein a numerical quantity of candidate UE receive beams in the first subset of candidate UE receive beans is based at least in part on a number of measurement occasions in the set of measurement occasions.

10. An apparatus for wireless communication at a user equipment (UE), comprising:
    a processor;
    memory coupled with the processor; and
    instructions stored in the memory and executable by the processor to cause the apparatus to:
    measure a reference signal over a first subset of a set of measurement occasions using a serving UE receive beam according to a serving beam measurement periodicity;
    measure the reference signal over a second subset of the set of measurement occasions using a first subset of candidate UE receive beams of a set of candidate UE receive beams, each candidate UE receive beam in the first subset of candidate UE receive beams satisfying a performance threshold relative to the serving UE receive beam;
measure the reference signal over a third subset of the set of measurement occasions using a second subset of candidate UE receive beams of the set of candidate UE receive beams, each candidate UE receive beam in the second subset of candidate UE receive beams failing to satisfy the performance threshold relative to the serving UE receive beam; and
perform beam switching to a candidate UE receive beam of the set of candidate UE receive beams based at least in part on a result of measuring the reference signal.

11. The apparatus of claim 10, wherein the second subset of the set of measurement occasions includes at least one measurement occasion within each time period of the serving beam measurement periodicity.

12. The apparatus of claim 10, wherein the instructions are further executable by the processor to cause the apparatus to:
determine that a first candidate UE receive beam of the second subset of candidate UE receive beams satisfies the performance threshold relative to the serving UE receive beam; and
add the first candidate UE receive beam to the first subset of candidate UE receive beams based at least in part on the determining.

13. The apparatus of claim 12, wherein the instructions are further executable by the processor to cause the apparatus to:
determine, based at least in part on the adding, that a numerical quantity of candidate UE receive beams in the first subset of candidate UE receive beams exceeds a threshold quantity; and
demote a second candidate UE receive beam associated with a second performance threshold to the second subset of candidate UE receive beams to the second subset of candidate UE receive beams.

14. The apparatus of claim 10, wherein the instructions are further executable by the processor to cause the apparatus to:
scheduling measurements during the second subset of the set of measurement occasions where each candidate UE receive beam in the first subset of candidate UE receive beams are measured a first measurement threshold number of times during the set of measurement occasions.

15. The apparatus of claim 10, wherein the instructions are further executable by the processor to cause the apparatus to:
scheduling measurements during the third subset of the set of measurement occasions where each candidate UE receive beam in the second subset of candidate UE receive beams are measured a second measurement threshold number of times during the set of measurement occasions.

16. The apparatus of claim 10, wherein each candidate UE receive beam in the second subset of candidate UE receive beams satisfy a second threshold that is different from the performance threshold.

17. The apparatus of claim 10, wherein the reference signal comprises a synchronization signal block signal.

18. The apparatus of claim 10, wherein a numerical quantity of candidate UE receive beams in the first subset of candidate UE receive beans is based at least in part on a number of measurement occasions in the set of measurement occasions.

19. An apparatus for wireless communication at a user equipment (UE), comprising:
means for measuring a reference signal over a first subset of a set of measurement occasions using a serving UE receive beam according to a serving beam measurement periodicity;
means for measuring the reference signal over a second subset of the set of measurement occasions using a first subset of candidate UE receive beams of a set of candidate UE receive beams, each candidate UE receive beam in the first subset of candidate UE receive beams satisfying a performance threshold relative to the serving UE receive beam;
means for measuring the reference signal over a third subset of the set of measurement occasions using a second subset of candidate UE receive beams of the set of candidate UE receive beams, each candidate UE receive beam in the second subset of candidate UE receive beams failing to satisfy the performance threshold relative to the serving UE receive beam; and
means for performing beam switching to a candidate UE receive beam of the set of candidate UE receive beams based at least in part on a result of measuring the reference signal.

20. The apparatus of claim 19, wherein the second subset of the set of measurement occasions includes at least one measurement occasion within each time period of the serving beam measurement periodicity.

21. The apparatus of claim 19, further comprising:
means for determining that a first candidate UE receive beam of the second subset of candidate UE receive beams satisfies the performance threshold relative to the serving UE receive beam; and
means for adding the first candidate UE receive beam to the first subset of candidate UE receive beams based at least in part on the determining.

22. The apparatus of claim 21, further comprising:
means for determining, based at least in part on the adding, that a numerical quantity of candidate UE receive beams in the first subset of candidate UE receive beams exceeds a threshold quantity; and
means for demoting a second candidate UE receive beam associated with a second performance threshold to the second subset of candidate UE receive beams to the second subset of candidate UE receive beams.

23. The apparatus of claim 19, further comprising:
means for scheduling measurements during the second subset of the set of measurement occasions where each candidate UE receive beam in the first subset of candidate UE receive beams are measured a first measurement threshold number of times during the set of measurement occasions.

24. The apparatus of claim 19, further comprising:
means for scheduling measurements during the third subset of the set of measurement occasions where each candidate UE receive beam in the second subset of candidate UE receive beams are measured a second measurement threshold number of times during the set of measurement occasions.

25. The apparatus of claim 19, wherein each candidate UE receive beam in the second subset of candidate UE receive beams satisfy a second threshold that is different from the performance threshold.

26. The apparatus of claim 19, wherein the reference signal comprises a synchronization signal block signal.

27. The apparatus of claim 19, wherein a numerical quantity of candidate UE receive beams in the first subset of candidate UE receive beans is based at least in part on a number of measurement occasions in the set of measurement occasions.

28. A non-transitory computer-readable medium storing code for wireless communication at a user equipment (UE), the code comprising instructions executable by a processor to:
  measure a reference signal over a first subset of a set of measurement occasions using a serving UE receive beam according to a serving beam measurement periodicity;
  measure the reference signal over a second subset of the set of measurement occasions using a first subset of candidate UE receive beams of a set of candidate UE receive beams, each candidate UE receive beam in the first subset of candidate UE receive beams satisfying a performance threshold relative to the serving UE receive beam;
  measure the reference signal over a third subset of the set of measurement occasions using a second subset of candidate UE receive beams of the set of candidate UE receive beams, each candidate UE receive beam in the second subset of candidate UE receive beams failing to satisfy the performance threshold relative to the serving UE receive beam; and
  perform beam switching to a candidate UE receive beam of the set of candidate UE receive beams based at least in part on a result of measuring the reference signal.

29. The non-transitory computer-readable medium of claim 28, wherein the second subset of the set of measurement occasions includes at least one measurement occasion within each time period of the serving beam measurement periodicity.

30. The non-transitory computer-readable medium of claim 28, wherein the instructions are further executable by the processor to:
  determine that a first candidate UE receive beam of the second subset of candidate UE receive beams satisfies the performance threshold relative to the serving UE receive beam; and
  add the first candidate UE receive beam to the first subset of candidate UE receive beams based at least in part on the determining.

\* \* \* \* \*